(12) United States Patent
Huang et al.

(10) Patent No.: US 9,330,047 B2
(45) Date of Patent: May 3, 2016

(54) WIRELESS DOCKING SERVICE WITH DIRECT CONNECTION TO PERIPHERALS

(71) Applicant: QUALCOMM Incorporated, San Diego, CA (US)

(72) Inventors: Xiaolong Huang, San Diego, CA (US); Phanikumar Kanakadurga Bhamidipati, San Diego, CA (US); Vijayalakshmi Rajasundaram Raveendran, San Diego, CA (US); Rolf De Vegt, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 14/020,316

(22) Filed: Sep. 6, 2013

(65) Prior Publication Data

US 2014/0201415 A1 Jul. 17, 2014

Related U.S. Application Data

(60) Provisional application No. 61/752,792, filed on Jan. 15, 2013.

(51) Int. Cl.
*G06F 13/00* (2006.01)
*G06F 13/40* (2006.01)
*G06F 13/10* (2006.01)
(Continued)

(52) U.S. Cl.
CPC .......... *G06F 13/4081* (2013.01); *G06F 1/1632* (2013.01); *G06F 13/00* (2013.01); *G06F 13/102* (2013.01); *G06F 13/4022* (2013.01); *H04W 24/00* (2013.01); *G06F 2213/3814* (2013.01)

(58) Field of Classification Search
USPC ................... 710/303, 304, 313, 200
See application file for complete search history.

(56) References Cited

U.S. PATENT DOCUMENTS

| 6,170,026 B1 | 1/2001 | Kimura et al. |
| 6,282,590 B1 | 8/2001 | Ellis et al. |
| 8,462,734 B2 * | 6/2013 | Laine et al. ................... 370/331 |

(Continued)

FOREIGN PATENT DOCUMENTS

| EP | 2555490 A2 | 2/2013 |
| WO | 2010110956 A2 | 9/2010 |
| WO | 2013028359 A1 | 3/2013 |

OTHER PUBLICATIONS

International Search Report and Written Opinion—PCT/US2013/075113—ISA/EPO—Apr. 22, 2014, 9 pp.

(Continued)

*Primary Examiner* — Khanh Dang
(74) *Attorney, Agent, or Firm* — Shumaker & Sieffert, P.A.

(57) ABSTRACT

In one example, a method includes receiving, from a user application and with a wireless docking service of a wireless docking communications stack executing on a computing device, a request to discover one or more peripheral functions within wireless communication range of the computing device. The method also includes, responsive to receiving the request, discovering, with the wireless docking service, the one or more peripheral functions without communicating with a wireless docking center. The method further includes consolidating the peripheral functions into a docking session for the user application. The method also includes, responsive to receiving the request, sending a docking session identifier and one or more respective references corresponding to the one or more peripheral functions to the user application.

40 Claims, 16 Drawing Sheets

(51) Int. Cl.
*G06F 1/16* (2006.01)
*H04W 24/00* (2009.01)

(56) References Cited

U.S. PATENT DOCUMENTS

| | | | |
|---|---|---|---|
| 8,472,436 B2 | 6/2013 | Meiri et al. | |
| 8,554,970 B2 * | 10/2013 | Suumaki et al. | 710/303 |
| 8,566,498 B2 | 10/2013 | Lemarchand et al. | |
| 9,131,335 B2 | 9/2015 | Huttunen et al. | |
| 2002/0169977 A1 | 11/2002 | Chmaytelli | |
| 2002/0186329 A1 * | 12/2002 | Tong et al. | 348/839 |
| 2006/0233191 A1 | 10/2006 | Pirzada et al. | |
| 2008/0070501 A1 | 3/2008 | Wyld | |
| 2008/0195788 A1 | 8/2008 | Tamir et al. | |
| 2008/0252419 A1 | 10/2008 | Batchelor et al. | |
| 2009/0063744 A1 * | 3/2009 | Krueger et al. | 710/303 |
| 2010/0057969 A1 | 3/2010 | Meiri et al. | |
| 2010/0322213 A1 | 12/2010 | Liu et al. | |
| 2011/0149806 A1 | 6/2011 | Verma et al. | |
| 2011/0162035 A1 | 6/2011 | King et al. | |
| 2011/0188391 A1 | 8/2011 | Sella et al. | |
| 2012/0099566 A1 | 4/2012 | Laine et al. | |
| 2012/0265913 A1 | 10/2012 | Suumaeki et al. | |
| 2012/0304280 A1 | 11/2012 | Hayashida | |
| 2013/0021975 A1 | 1/2013 | Cordeiro | |
| 2013/0040576 A1 | 2/2013 | Yoon | |
| 2013/0304959 A1 | 11/2013 | Chiang | |
| 2013/0307665 A1 | 11/2013 | Wang et al. | |
| 2014/0201415 A1 | 7/2014 | Huang et al. | |
| 2014/0349578 A1 | 11/2014 | Huang et al. | |
| 2014/0351475 A1 | 11/2014 | Huang et al. | |
| 2014/0351476 A1 | 11/2014 | Huang et al. | |
| 2014/0351927 A1 | 11/2014 | Huang et al. | |
| 2015/0056920 A1 | 2/2015 | Huttunen et al. | |
| 2015/0100715 A1 | 4/2015 | Huang et al. | |

OTHER PUBLICATIONS

International Preliminary Report on Patentability—PCT/US2013/075113—IPEA—Jan. 12, 2015, 6 pp.
Wi-Fi Alliance: "Wi-Fi Certified Wi-Fi Direc," XP055041124, Oct. 2010, 14 pp.
"Wi-Fi Peer-to-Peer (P2P) Specification v1.2", Wi-Fi Peer-To-Peer (P2P) Specification V 1.2, Wi-Fi Alliance US, vol. V 1.2, 2010, XP008165048, Mar. 30, 2014 159 pp.
Tieu et al., "Wi-Fi Direct Services," Jun. 18, 2014 (Jun. 1, 2014 ), XP055158480, Retrieved from the Internet: URL: D hllp:l/www.eil.lth.se/sprapport.php?uid=818, 73 pp.

* cited by examiner

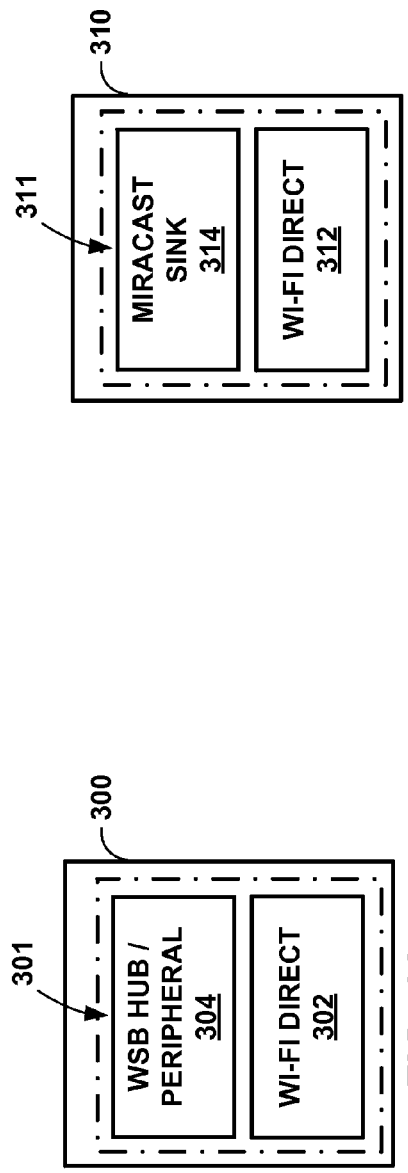
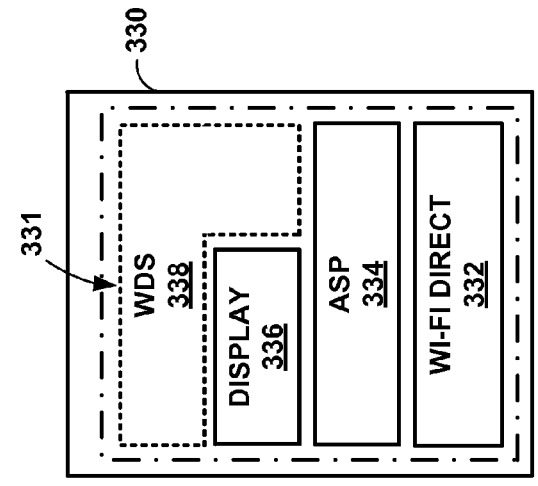
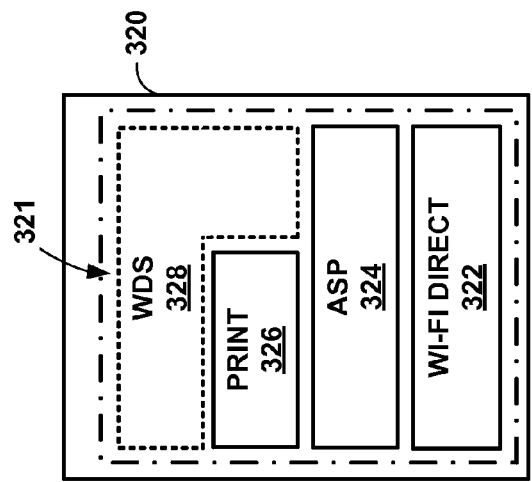

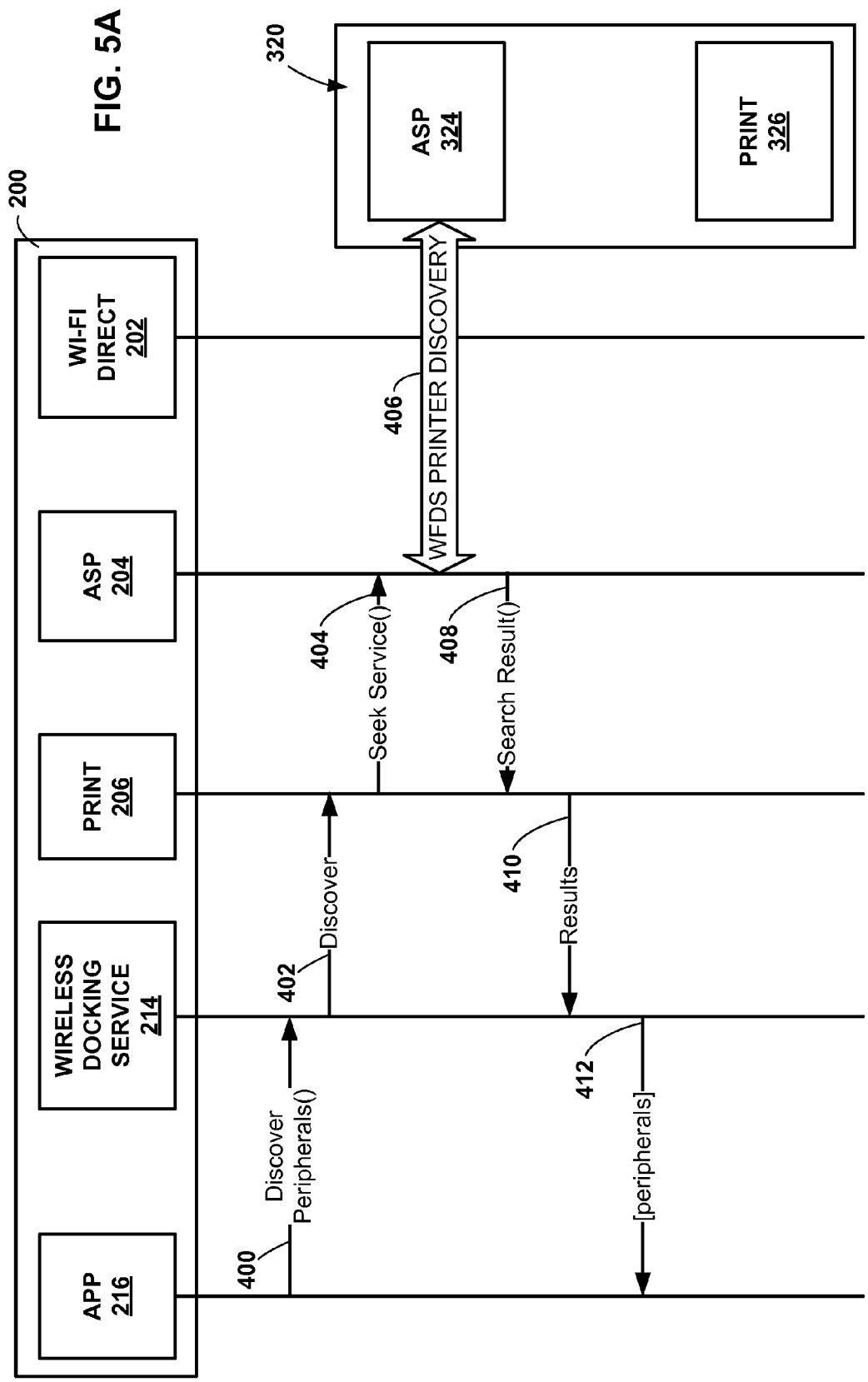

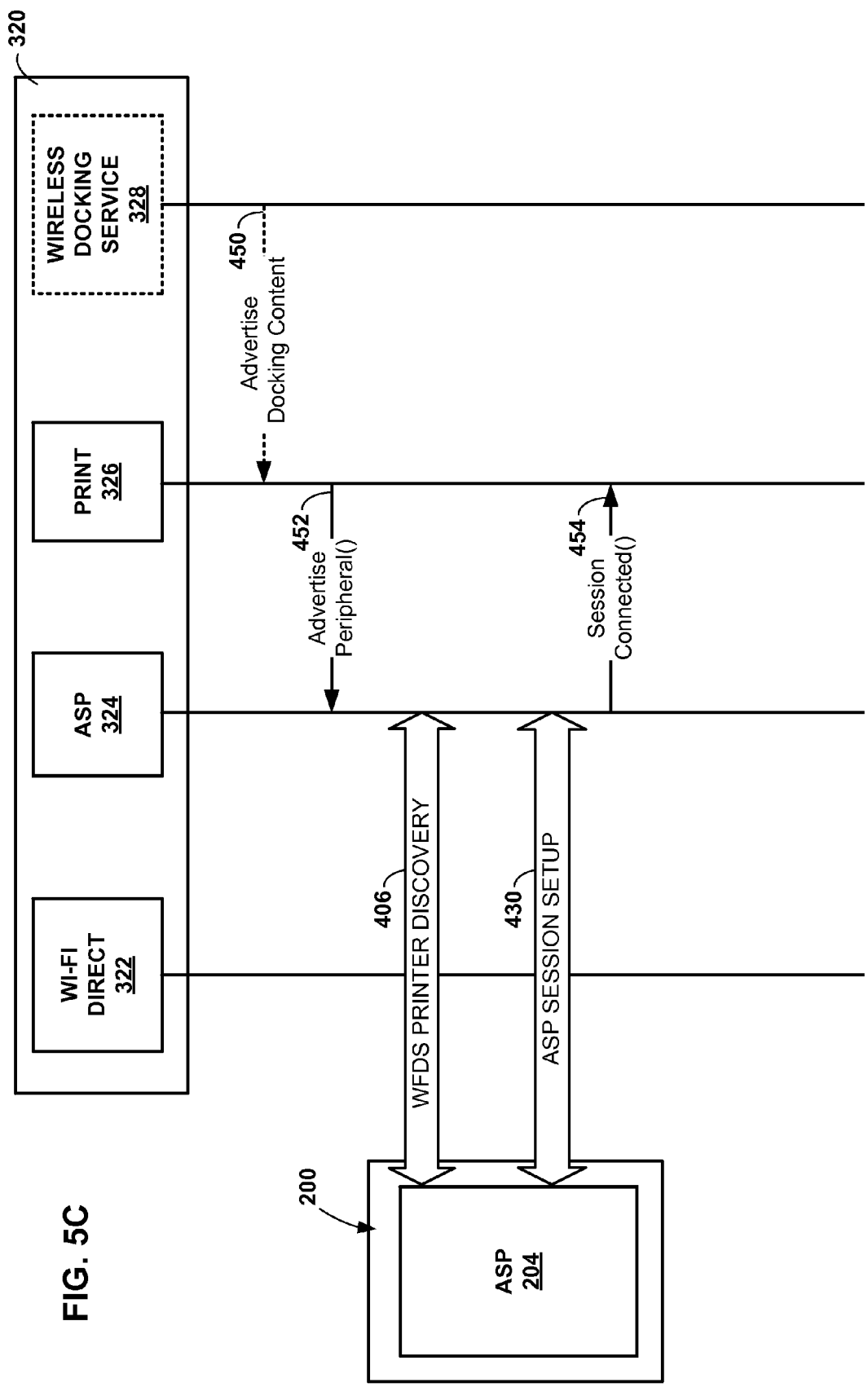

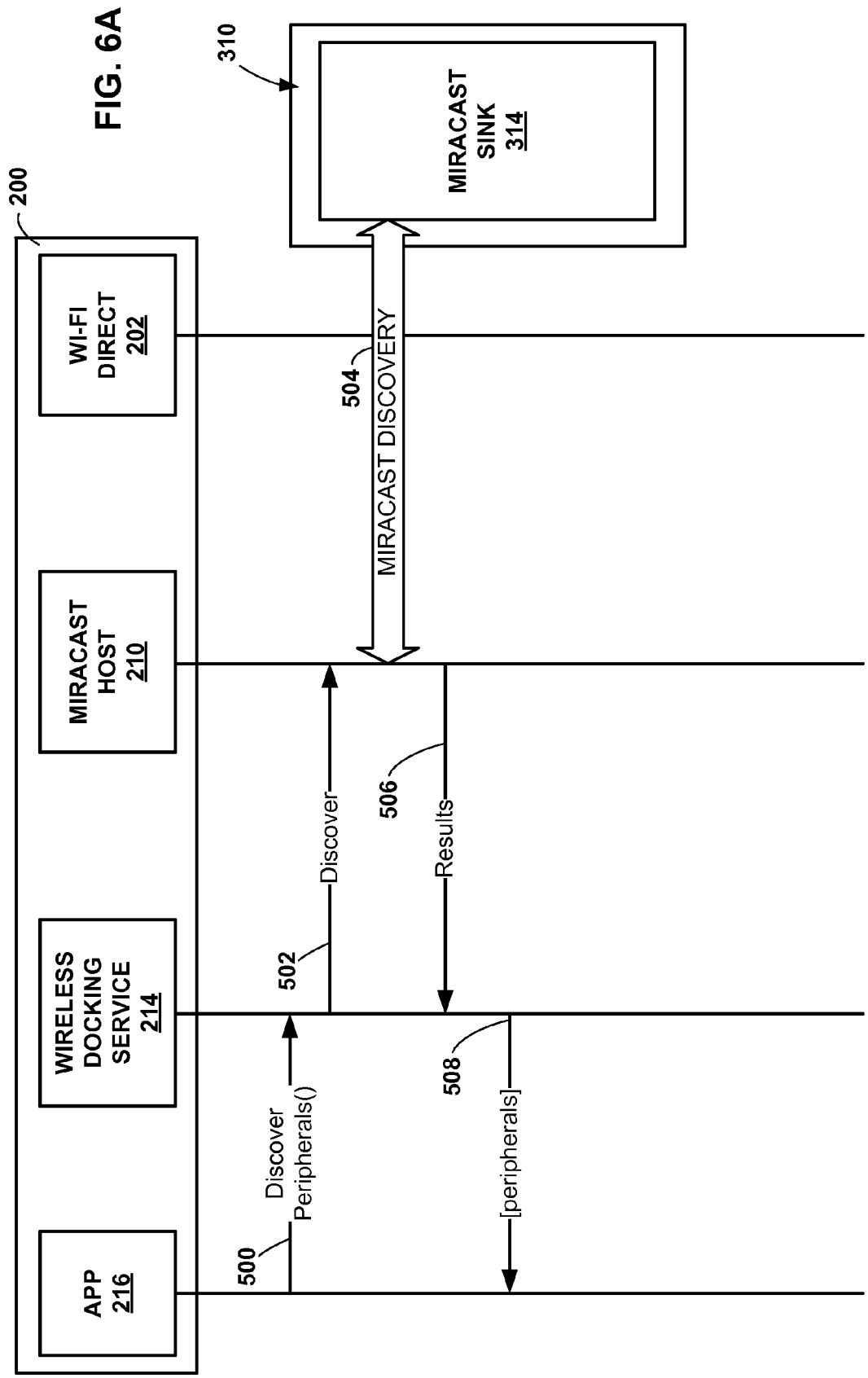

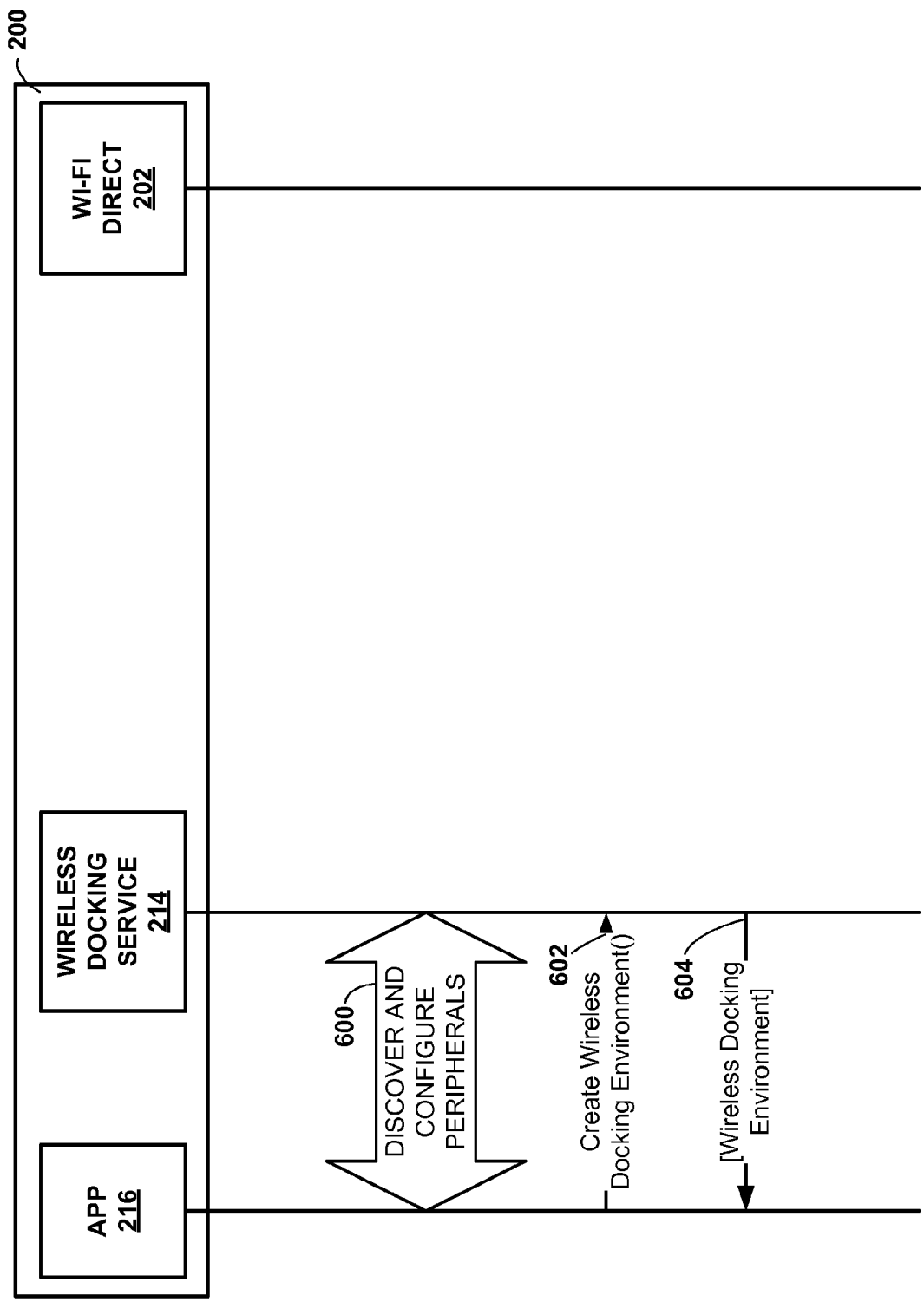

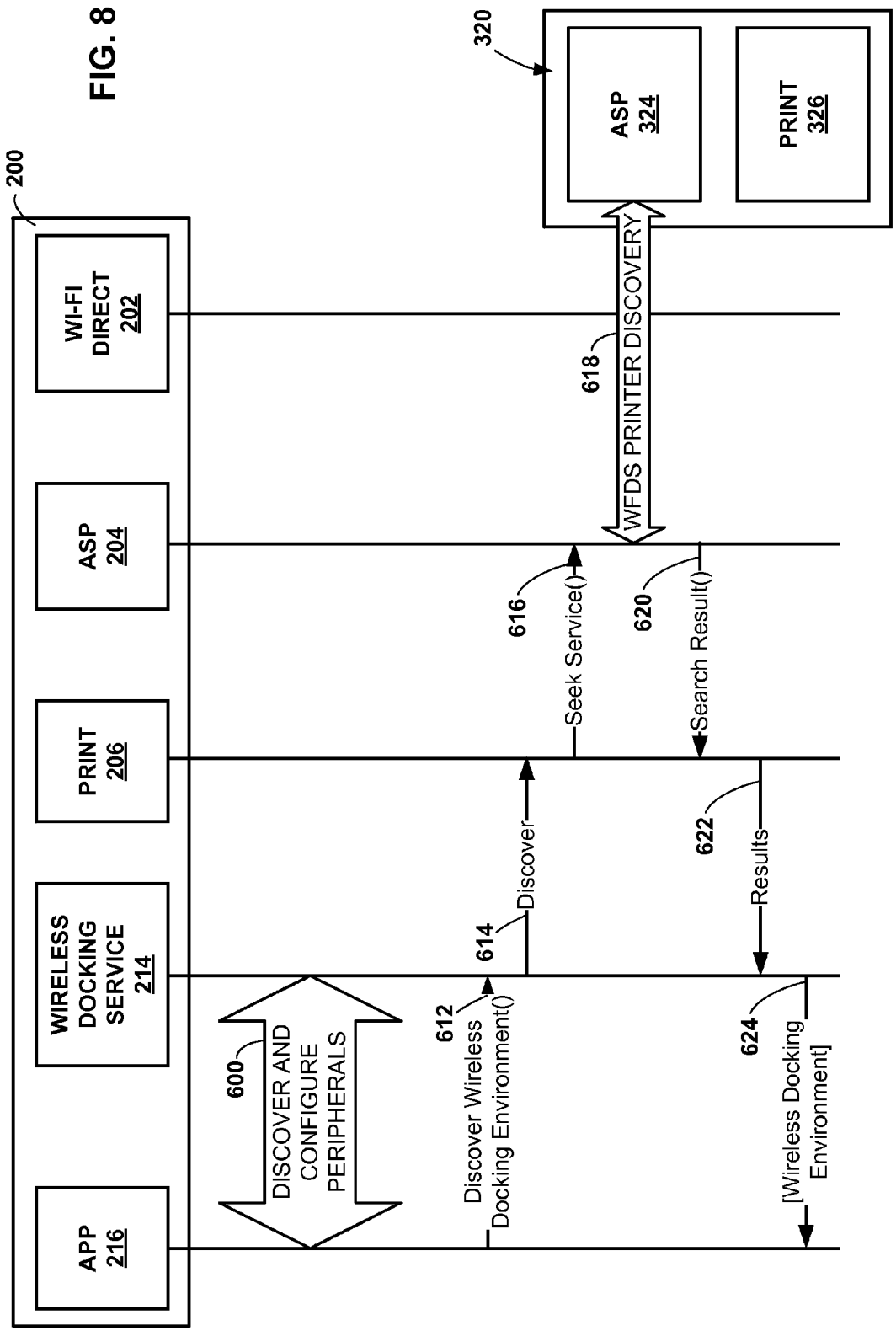

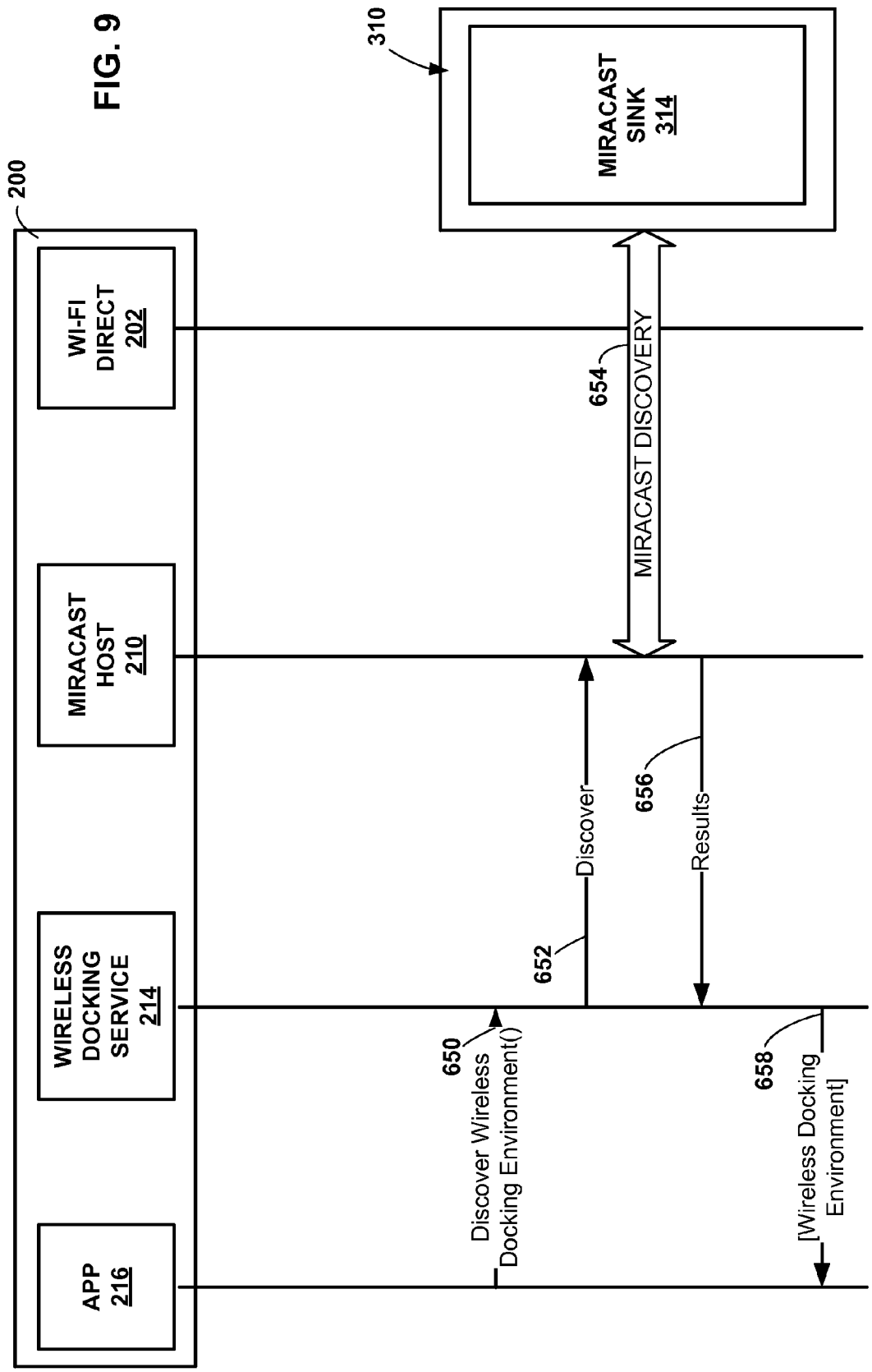

WIRELESS DOCKING SERVICE WITH DIRECT CONNECTION TO PERIPHERALS

This application claims the benefit of U.S. Provisional Application No. 61/752,792, filed Jan. 15, 2013, the entire content of which is incorporated herein by reference in its entirety.

TECHNICAL FIELD

This disclosure relates to techniques for wireless docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations typically require a physical connection between the electronic device and the docking station. Additionally, the electronic device and the docking station typically establish docking communications before docking functions may be used.

SUMMARY

In general, this disclosure describes techniques for a wireless docking system in which a wireless dockee, such as a mobile computing device, may wirelessly and directly dock with one or more peripheral devices using a wireless docking service that provides a uniform interface for controlling and/or exchanging data with peripheral devices. More specifically, the wireless docking service may provide applications executing on the wireless dockee with an interface for discovering and obtaining references to peripheral devices, for configuring one or more of the peripheral devices discovered, and for using one or more of the peripheral devices discovered according to peripheral-specific functionality.

In some examples, this disclosure describes a wireless dockee that includes a processor, and a memory coupled to the processor. The memory stores instructions for causing the processor to execute a software stack that includes a wireless docking service (WDS). The WDS provides an Application Programming Interface (API) for an application executed by the processor. The API of the WDS consolidates Application Service Platform (ASP) communications and communications for Peripheral Function Protocols (PFPs), such as WiFi Serial Bus (WSB), Bluetooth, or Miracast, to provide an interface to applications executed by the wireless dockee. The WDS may enable the application to discover, configure, and select peripheral devices with which to directly dock using wireless docking sessions that are unmediated by a wireless docking center (WDC). The wireless dockee may directly connect through the WDS to selected peripheral devices and utilize the API to engage PFPs in order to control and exchange data with the corresponding selected peripherals. In other words, once the wireless dockee and the selected peripherals directly connect through the WDS, the wireless dockee may operate a wireless docking session to make use of the wireless docking ASP and PFPs for the peripherals. In this way, the wireless dockee may directly control and exchange data with the peripherals without relying on consolidated wireless docking session connections provided by a WDC.

In some examples, the WDS additionally provides an API to allow the application create a wireless docking environment (WDN) that includes a set of one or more peripherals. The API may further enable the application to discover one or more WDNs previously created, and to select one of the discovered WDNs to operate a docking session to make use of the ASP and PFPs for the peripherals. The WDS may also manage the topology for one or more direct wireless docking session connections and/or the topology of the WDNs.

The techniques of this disclosure may provide one or more advantages. For example, a wireless docking system that operates without communication mediation by a WDC does not require implementation of a WDC that is interoperable with both the wireless dockee and the peripheral devices. This may speed development of wireless docking system protocols, reduce outlays for the additional WDC device, and/or eliminate a requirement for a standardized docking protocol to be implemented for the wireless dockee. In addition, many legacy wireless peripherals may as a consequence connect directly to the wireless dockee, unmediated by a WDC and attendant protocols.

In some examples, a method includes receiving, from a user application and with a wireless docking service of a wireless docking communications stack executing on a computing device, a request to discover one or more peripheral functions within wireless communication range of the computing device. The method also includes, responsive to receiving the request, discovering, with the wireless docking service, the one or more peripheral functions without communicating with a wireless docking center. The method further includes consolidating the peripheral functions into a docking session for the user application. The method also includes, responsive to receiving the request, sending a docking session identifier and one or more respective references corresponding to the one or more peripheral functions to the user application.

In another example, a device includes one or more processors. The one or more processors are configured to receive, from a user application and with a wireless docking service of a wireless docking communications stack executing on the device, a request to discover one or more peripheral functions within wireless communication range of the device. The one or more processors are also configured to, responsive to receiving the request, discover, with the wireless docking service, the one or more peripheral functions without communicating with a wireless docking center. The one or more processors are further configured to consolidate the peripheral functions into a docking session for the user application. The one or more processors are also configured to, responsive to receiving the request, send a docking session identifier and one or more respective references corresponding to the one or more peripheral functions to the user application.

In another example, an apparatus includes means for receiving, from a user application and with a wireless docking service of a wireless docking communications stack executing on the apparatus, a request to discover one or more peripheral functions within wireless communication range of the apparatus. The apparatus also includes means for, responsive to receiving the request, discovering, with the wireless docking service, the one or more peripheral functions without communicating with a wireless docking center. The apparatus further includes means for consolidating the peripheral functions into a docking session for the user application. The apparatus also includes means for, responsive to receiving the request, sending a docking session identifier and one or more respective references corresponding to the one or more peripheral functions to the user application.

In another example, a computer-readable storage medium includes instructions stored thereon that, when executed, configure one or more processors to receive, from a user application and with a wireless docking service of a wireless docking communications stack executing on a computing device, a request to discover one or more peripheral functions within wireless communication range of the computing device. The instructions further configure the one or more processors to, responsive to receiving the request, discover, with the wireless docking service, the one or more peripheral functions without communicating with a wireless docking center. The instructions further configure the one or more processors to consolidate the peripheral functions into a docking session for the user application. The instructions further configure the one or more processors to, responsive to receiving the request, send a docking session identifier and one or more respective references corresponding to the one or more peripheral functions to the user application.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4D illustrate example software stacks for various peripheral devices used by a computing device that implements a wireless docking communications stack for establishing unmediated docking sessions with the peripheral devices to consolidate one or more peripheral functions into common docking session in accordance with techniques of this disclosure.

FIGS. 5A-5C depict a flow diagram for example call flows by which a user application executing on a computing device uses an wireless docking service to exchange communications with peripherals, unmediated by a wireless docking center, to discover, configure, and select peripherals to establish and operate a consolidated docking session, in accordance with one or more examples of this disclosure.

FIGS. 6A-6C depict a call flow diagram for example call flows by which a user application executing on a computing device uses an wireless docking service to exchange communications with peripherals, unmediated by a wireless docking center, to discover, configure, and select peripherals to establish and operate a consolidated docking session, in accordance with one or more examples of this disclosure.

FIG. 7 depicts a call flow diagram for example call flows for creating a persistent wireless docking environment, in accordance with techniques described in this disclosure.

FIG. 8 depicts a call flow diagram for example call flows for discovering available peripherals and using the discovered peripherals to create a persistent wireless docking environment, in accordance with techniques described in this disclosure.

FIG. 9 depicts a call flow diagram for example call flows for discovering available peripherals and using the discovered peripherals to create a persistent wireless docking environment, in accordance with techniques described in this disclosure.

Like reference characters denote like elements throughout the figures and text.

DETAILED DESCRIPTION

Figure 1:
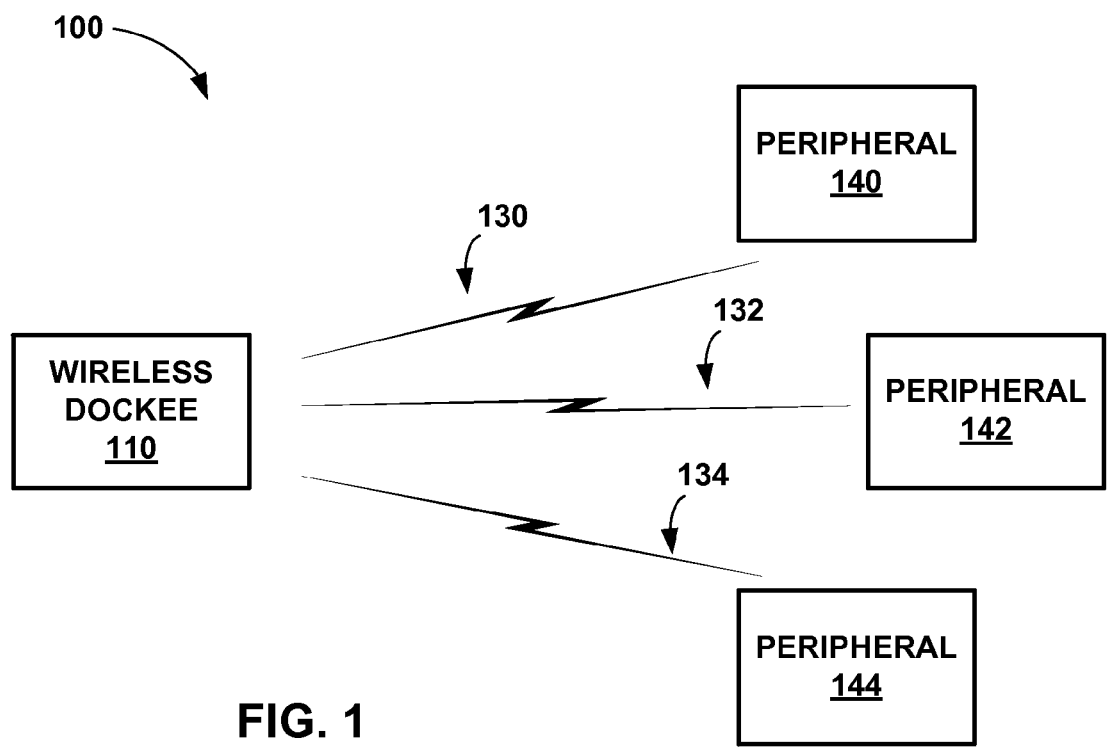
FIG. 1 is a conceptual diagram of an example wireless docking system in which a wireless dockee uses a wireless docking service to communicate with multiple peripherals over one or more wireless communication channels.

This disclosure describes an architecture for wireless docking without a wireless docking center. The Wireless Docking Special Interest Group (SIG) has been developing an interoperable wireless docking solution in which a Wireless Docking Center (WDC) manages its peripherals and provides consolidate connections for a mobile to easily connect to and use the peripherals. Described herein is a wireless docking solution in which a mobile directly connects to wireless peripherals without a WDC. A WDC-less Docking system does not require any vendor to implement an interoperable WDC. In addition, A WDC-less docking system may not require any standardized docking protocol to be implemented on a mobile or other computing device.

As described in greater detail below, this disclosure describes wireless communication techniques, protocols, methods, and devices applicable to a wireless docking system in which a wireless dockee, such as a mobile computing device, may wirelessly and directly dock with one or more peripheral devices using a wireless docking service that provides an interface for controlling and/or exchanging data with peripheral devices. The wireless docking service (WDS) may consolidate Application Service Platform (ASP) communications and Peripheral Function Protocol (PFP) communications, such as WiFi Serial Bus (WSB) and Miracast communications, to provide an interface to applications executed by the wireless dockee. The WDS may execute as part of a software protocol stack that includes an interface for Wi-Fi communications, and the WDS executing on top of the ASP and PFPs may be implemented as a Wi-Fi docking service or a wireless docking service using a subset of Wi-Fi docking. For example, the wireless docking service may use a subset of Wi-Fi docking standards directed to peer-to-peer (P2P) topology, generally in accordance with the set of standards promoted as "Wi-Fi Direct" by the Wi-Fi Alliance.

An ASP is generally a wireless communications stack that may enable devices to easily advertise, seek and provide services over a wireless network, such as a Wi-Fi Direct certified network. The wireless stack forming the ASP may be implemented to comply with Wi-Fi Direct certification. The remainder of this disclosure makes reference to the example of a wireless docking service (WDS) implemented for operating through a Wi-Fi Direct ASP, that is, a wireless ASP implemented to comply with Wi-Fi Direct certification, as one illustrative example of a wireless docking service of this disclosure. This is done with the understanding that a WDS through Wi-Fi Direct ASP is merely one example, and a WDS may also be implemented in accordance with a variety of wireless standards, protocols, and technologies. For example, a WDS may also be implemented in accordance with WiGig and/or one or more of the Institute of Electrical and Electronics Engineers (IEEE) 802.11 set of standards (e.g., 802.11, 802.11a, 802.11b, 802.11g, 802.11n, 802.11ac, 802.11ad, etc.), or extensions of Wi-Fi, WiGig, and/or one or more 802.11 standards.

A wireless docking service operating on top of the ASP and the PFPs may enable peripherals to advertise their specific docking services directly to wireless dockees. A WDS operating on top of the ASP and the PFPs may also enable wireless dockees to discover peripherals that provide docking services. A WDS operating on top of the ASP and the PFPs may also enable peripherals and wireless dockees to connect to each other and establish wireless docking sessions with each other. The wireless docking session may enable services provided by peripheral devices that are coupled to the wireless dockee by the WDS. For example, the peripherals may include displays, projectors, speakers, keyboards, mice, joysticks, data storage devices, network interface devices, other docking hosts, remote controls, cameras, microphones, printers, or other devices. Such peripheral devices may include stand-alone devices or components of devices such as other computers, in different examples. A wireless dockee device, such as a mobile handset, may wirelessly dock with a wireless docking center using the WDS operating through the ASP, thereby enabling the wireless dockee device to access services provided by any of the peripherals, in some examples.

FIG. 1 is a conceptual diagram of an example wireless docking system in which a wireless dockee uses a wireless docking service to communicate with multiple peripherals over one or more wireless communication channels. In the illustrated example, the wireless docking system 100 includes the wireless dockee (WD) 110 that represents a computing device configured for wireless docking and referred to as a wireless dockee in the context of a wireless docking system 100. The wireless dockee 110 may be a mobile device such as a smartphone or other mobile handset, a tablet computer, a laptop computer, or other computing devices. The wireless dockee 110 may be a stationary device such as a desktop computer. The wireless dockee 110 may also be a component of a larger device or system. For example, the wireless dockee 110 may be a processor, a processing core, a chipset, or other one or more integrated circuits.

The peripheral devices 140, 142, 144 of the wireless docking system 100 may include displays, projectors, speakers, keyboards, mice, joysticks, data storage devices, network interface devices, other docking hosts, remote controls, cameras, microphones, printers, or any of various other devices capable of wireless communication with WD 110. WD 110 may engage services provided by peripherals 140, 142, 144. WD 110 may couple to peripherals 140, 142, 144 via wireless communication channels to operate and/or exchange data with peripherals 140, 142, 144 in accordance with the services accessible to WD 110.

Wireless communication channels 130, 132, 134 may be any channels capable of propagating communicative signals between the WD 110 and the respective peripherals 140, 142, 144. In some examples, the wireless communication channels 130, 132, 134 may be implemented in radio frequency communications in frequency bands such as the 2.4 gigahertz (GHz) band, the 5 GHz band, the 60 GHz band, or other frequency bands. In some examples, the wireless communication channels 130, 132, 134 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used for the wireless communication channels 130, 132, 134, such as the 2.4 GHz, 5 GHz, and 60 GHz bands, may be defined for purposes of this disclosure as they are understood in light of the standards of Wi-Fi, WiGig, any one or more IEEE 802.11 protocols, and/or other applicable standards or protocols. In some examples, the wireless communications channels 130, 132, 134 may represent a single wireless communication channel multiplexed among peripherals 140, 142, 144.

The wireless dockee 110 may establish communications with any subset of the peripherals 140, 142, 144 automatically once the WD 110 and the subset come within operative communication range of each other, or manually in response to a user input, in different examples. Example call flows between the WD 110 and the peripherals 140, 142, 144 establishing docking communications with each other is depicted in FIGS. 5A-5C, 6A-6C. The wireless dockee 110 and the peripherals 140, 142, 144 may use Application Service Platform (ASP) and/or Peripheral Function Protocols (PFPs), such as WiFi Serial Bus (WSB) and Miracast, to manage communications with each other for a variety of services, including a wireless docking service (WDS), as illustrated in FIGS. 5A-5C, 6A-6C.

Figure 2:
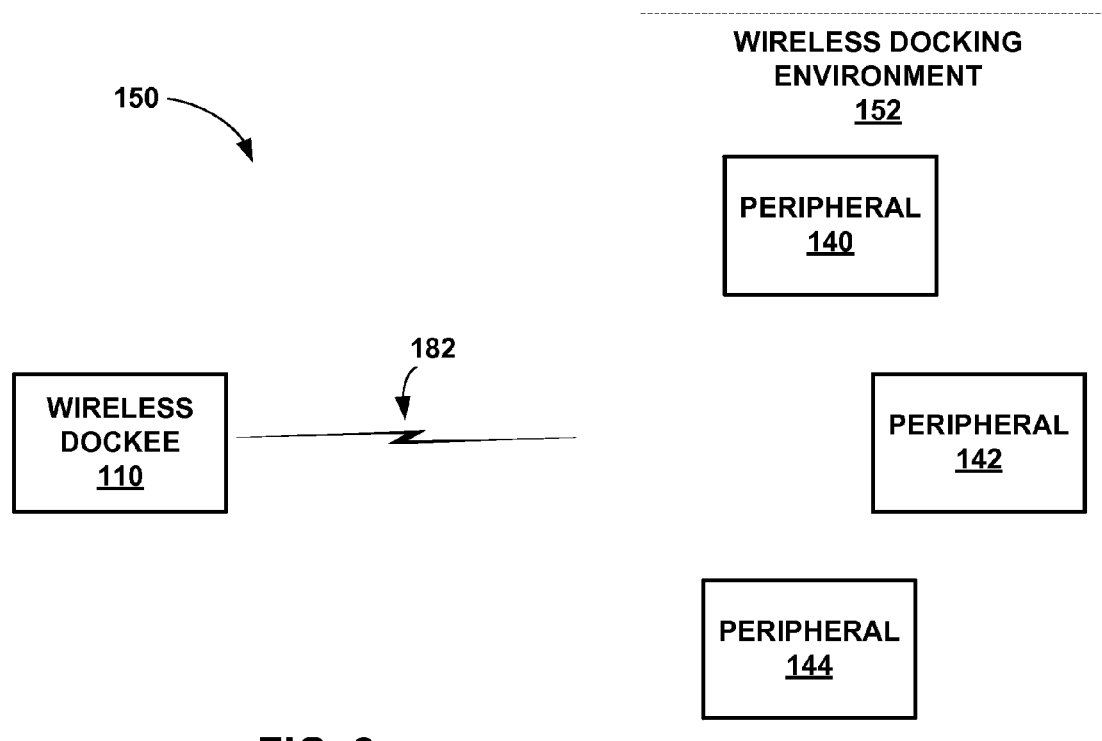
FIG. 2 is a conceptual diagram illustrating an example wireless docking system in which a wireless dockee uses a wireless docking service to create and use or discover and use a wireless docking environment that includes one or more peripheral devices.

FIG. 2 is a conceptual diagram illustrating an example wireless docking system in which a wireless dockee uses a wireless docking service to create and use or discover and use a wireless docking environment that includes one or more peripheral devices. In the illustrated example, the wireless docking system 150 includes the WD 110 and the peripherals 140, 142, 144 which may correspond to the WD 110 and the peripherals 140, 142, 144 of FIG. 1.

In some examples, the WD 110 uses a wireless docking service to create a wireless docking environment (WDN) 152 that includes the peripherals 140, 142, 144. In some examples, the WD 110 uses the wireless docking service to discover the wireless docking environment 152 already created by the WD 110 or another wireless dockee. The WD 110 may use the wireless docking service to select the WDN 152 to establish a wireless docking session by which the WD 110 may engage services provided by the peripherals 140, 142, 144. The wireless dockee 110 may couple to the WDN 152 via the wireless communication channel 182 to operate and/or exchange data with the peripherals 140, 142, 144 in accordance with services accessible to the WD 110. The wireless communication channel 182 may be similar to any of the wireless communication channels 130, 132, 134 of FIG. 1.

In the examples of FIGS. 1-2, the WD 110 may use a wireless docking service to consolidate connections with one or more peripherals into a common context, or "docking session," that may be used by one or more application(s) executing the WD 110 to easily connect to and use the peripherals.

Figure 3:
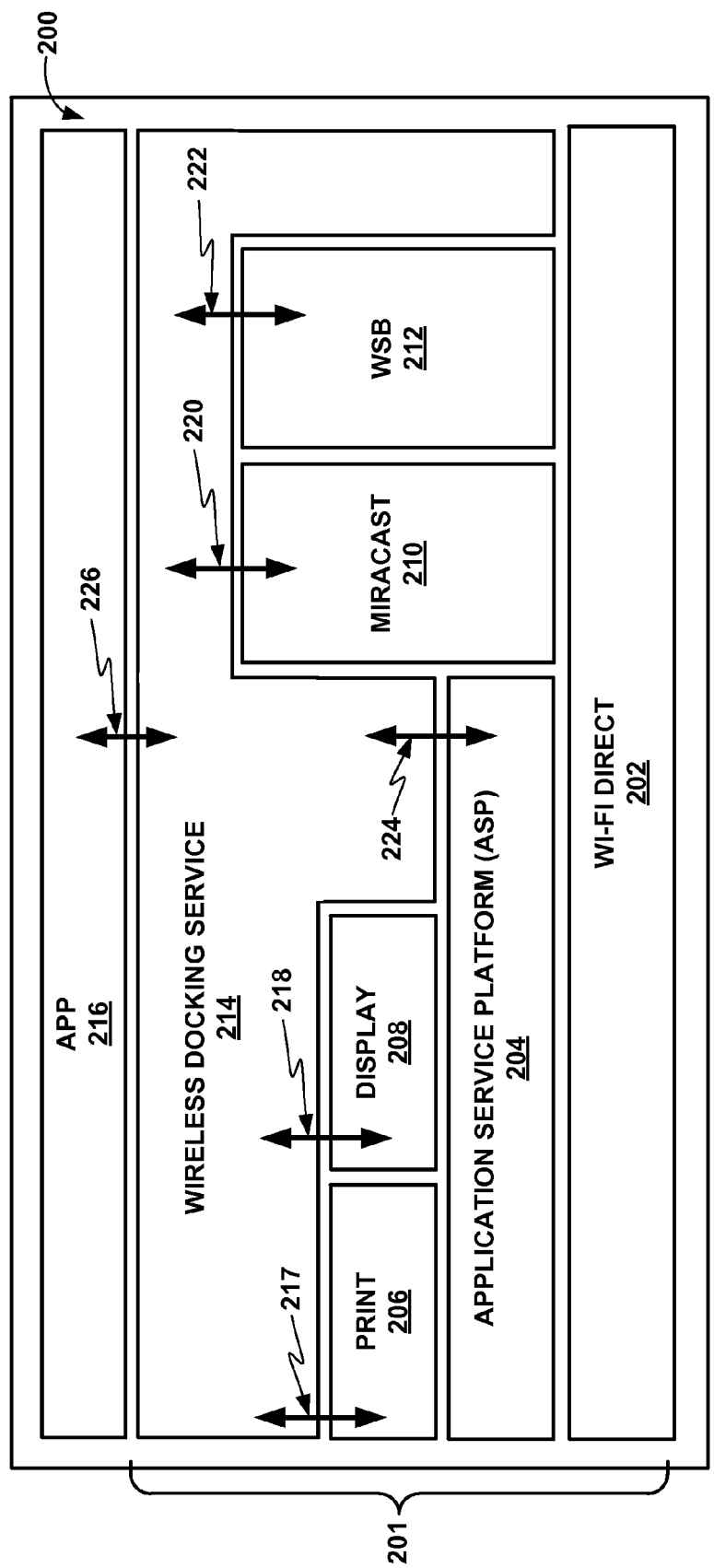
FIG. 3 is a conceptual diagram illustrating an example wireless docking communications stack that includes a wireless docking service by which a wireless dockee may directly communication with one or more peripheral devices.

FIG. 3 is a conceptual diagram illustrating an example wireless docking communications stack that includes a wireless docking service by which a wireless dockee may directly communication with one or more peripheral devices. In the illustrated example, the computing device 200 includes a user application 216 executing over a wireless docking communications stack 201. The computing device 200 may represent wireless dockee 110 of FIGS. 1-2. The wireless docking communications stack 201 includes a wireless docking service 214 that provides an application programming interface (API) 226 to the user application 216. The API 226 includes methods, data fields, and/or events by which the user application 216 may discover, configure, and select peripherals for use by the WD 110. In some examples, the API 226 includes an interface by which the user application 216 may create and/or discover WDNs that include peripherals for selection and use by the WD 110. Reference herein to "methods," "messages," and "signals," for instance, with respect to communication between different layers of a communication stack, should be considered interchangeable in that each of these different constructs may be used by the layers of a communication stack to provide/receive data, request an action or data or respond accordingly, or to send/receive a command. The methods, messages, and signals described may represent any of a number of different forms of communication, including messaging services, shared memory, pipes, network communication, and so forth.

In some example implementations, the API 226 includes the example methods of Table 1.

TABLE 1

Example Application Programming Interface

| Method | Parameters | Returns |
| --- | --- | --- |
| DiscoverPeripherals( ) | None | [peripherals] |
| ConfigurePeripherals( ) | subset of [peripherals] | None |
| UsePeripherals( ) | subset of [peripherals] | [docking session] |
| CreateWDN( ) | subset of [peripherals] | [WDN handle] |
| DiscoverWDN( ) | None | [WDN handles] |
| UseWDN( ) | [docking session] | [docking session] |
| Undock | [docking session] | None |

Accordingly, the user application 216 may use the API 226 to direct the wireless docking service 214 to discover ("DiscoverPeripherals"), configure ("ConfigurePeripherals"), and directly select ("UsePeripherals") peripherals to establish a docking session, as well as to undock a docking session ("Undock"). Alternatively, or in addition, the user application 216 may use the API 226 to direct the wireless docking service 214 to create a wireless docking environment ("CreateWDN") from a set of peripherals, discover an existing WDN ("DiscoverWDN"), and select a WDN that includes peripherals for use ("UseWDN").

Wireless docking is implemented as a wireless docking service (WDS) 214 operating over a wireless Application Service Platform layer 204 ("ASP 204") operating over Wi-Fi Direct wireless communications layer 202 ("Wi-Fi Direct 202"), in this example. The Wi-Fi Direct communications 202 are an example implementation of wireless communications over which the ASP 204 may operate.

Various wireless services may be enabled as interface layers over the ASP 204, including a Print service 206, a Display service 208, and other services in some examples. The wireless docking service 214 operates over each of the Print service 206 and the Display service 208 to provide an interface with the user application 216. The Print service 206 and the Display service 208 may be provided by one or more peripheral devices directly accessible to the computing device 200 and managed via the ASP communication layer 204 in some examples.

The WDS 214 may be provided as a Wi-Fi Direct service, and referred to as a Wi-Fi Direct Docking Service. The Wi-Fi Direct Docking Service can be a subset of Wi-Fi docking, in particular, a subset of Wi-Fi docking operating over a P2P Wi-Fi Direct topology, in the example of a Wi-Fi Direct implementation. The WDS 214 may, for example, be implemented as a software module that may be loaded onto or stored in a device such as the wireless dockee 110. Aspects of the WDS 214 may also be integrated with, pre-packaged with, or implemented in hardware in some examples. For example, the WDS 214 may be stored on, integrated with, or implemented by an integrated circuit or a chipset containing one or more integrated circuits and one or more memory components.

A packet-based transport layer protocol stack (not illustrated) may run on top of ASP 204, Miracast 210, and/or WiFi Serial Bus (WSB) 212. The packet-based transport layer may include an Internet Protocol (IP) communications layer and one or more of various Transport Layer communication layers. The IP communications layer may run on top of ASP 204, or directly on Wi-Fi Direct 202. The Transport Layer communications layer may include and one or more of Transmission Control Protocol (TCP), User Datagram Protocol (UDP), Stream Control Transmission Protocol (SCTP), or other Transport Layer communication protocols.

The wireless communications stack 201 includes several additional communication interfaces between different components of the wireless communications stack 201. A WDS Interface 224 between ASP 204 and the WDS 214 serves as a wireless docking interface for ASP methods and events. The WDS Interface 224 may implement WDS 214 running directly on ASP 204 to manage wireless docking communications directly with one or more peripherals.

Various other communication interfaces are also included in wireless docking communications stack 201. Communication interface 220 between Miracast 210 and WDS 214 serves as an interface for controlling and using Miracast operations. Communication interface 222 between WiFi Serial Bus (WSB) 212 and WDS 214 serves as an interface for controlling and using WiFi Serial Bus operations. Communication interface 217 between the Print service 206 and the WDS 214 serves as an interface for controlling and using the Print service 206 operations. Communication interface 218 between the Display service 208 and the WDS 214 serves as an interface for controlling and using Display service 208 operations.

FIGS. 4A-4D illustrate example software stacks for various peripheral devices used by a computing device that implements a wireless docking communications stack for establishing unmediated docking sessions with the peripheral devices to consolidate one or more peripheral functions into common docking session in accordance with techniques of this disclosure. The peripheral devices 300, 310, 320, and 330 may each represent any of the peripheral devices 140, 142, 144 of FIG. 1.

FIG. 4A depicts a peripheral device 300 having a communication stack 301 that includes a Wi-Fi Serial Bus (WSB) Hub/Peripheral layer 304 operating over Wi-Fi direct 302. Wi-Fi direct 302 may communicate with Wi-Fi direct 202 of FIG. 3, while WSB Hub/Peripheral layer 304 may communicate with the computing device 200 by WSB 212.

FIG. 4B depicts a peripheral device 310 having a communication stack 311 that includes a Miracast sink 314 operating over Wi-Fi direct 312. Wi-Fi direct 312 may communicate with Wi-Fi direct 202 of FIG. 3, while Miracast sink 314 may communicate with the computing device 200 by Miracast 210 (a Miracast source).

FIG. 4C depicts a peripheral device 320 having a communication stack 321 that includes an optional wireless docking service (WDS) layer 328 operating over Print service 326. WDS layer 328 may advertise the Print service 326 to the WDS 214 of FIG. 3. The Print service 326 may communicate with the Print service 206 of FIG. 3 over Wi-Fi direct 322 and Wi-Fi direct 202 of FIG. 3.

FIG. 4D depicts a peripheral device 330 having a communication stack 331 that includes an optional wireless docking service (WDS) layer 338 operating over Display service 336.

WDS layer 338 may advertise the Display service 336 to the WDS 214 of FIG. 3. The Display service 336 may communicate with the Display service 208 of FIG. 3 over Wi-Fi direct 332 and Wi-Fi direct 202 of FIG. 3.

Figure 5B:
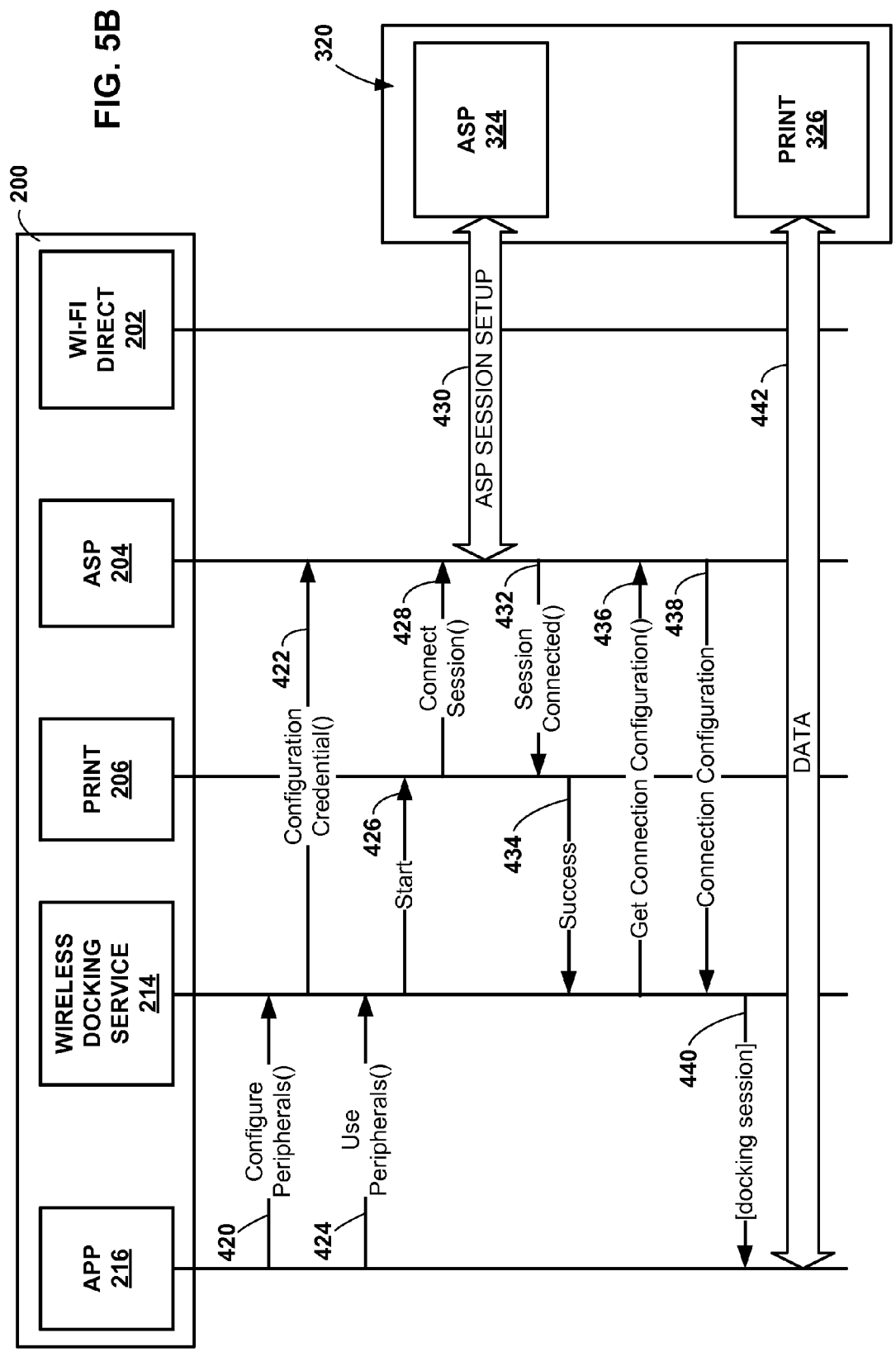

FIGS. 5A-5C depict a flow diagram for example call flows by which a user application executing on a computing device uses an wireless docking service to exchange communications with peripherals, unmediated by a wireless docking center, to discover, configure, and select peripherals to establish and operate a consolidated docking session, in accordance with one or more examples of this disclosure. The computing device 200 includes components of the example wireless docking communications stack 201 illustrated in FIG. 3, specifically, the wireless docking service 214, the Print service 206, the Application Service Platform (ASP) 204, and the Wi-Fi Direct layer 202. The application 216 executing on computing device 200 may invoke the wireless docking service 214 to establish a consolidated docking session including one or more peripheral devices, e.g., peripheral device 320.

In the illustrated example, the user application 216 of computing device 200 queries, by invoking DiscoverPeripherals( ) method 400, the WDS 214 of wireless docking communications stack 201 of computing device 200 to discover peripheral devices. The DiscoverPeripherals( ) method 400 may represent the DiscoverPeripherals( ) method listed in Table 1, above, for the API 226 of the wireless docking communications stack 201 of computing device 200.

The WDS 214 may issue communications for different sub-layers corresponding to different peripheral services. In this example, the WDS 214 performs device discovery. As part of device discovery, the WDS 214 may send one or more communications to sub-layers that include directives to discover available peripherals. In this example, the WDS 214 uses Discover message 402 by communication interface 217 to request the Print service 206 to request service discovery for one or more printer peripherals (corresponding to a Printer peripheral function type). This is merely one example of device discovery for a peripheral. Other examples for other types of peripherals functions, such as Display (cf. the Display service 208 of the computing device 200), Mouse, Keyboard, and so forth, are also contemplated.

The Print service 206 requests, from the ASP 204, service discovery for peripheral functions that conform to the Printer peripheral function type by issuing SeekService( ) message 404 to the ASP 204. The service discovery performed by the ASP 204 in response to SeekService( ) message 404, i.e., Wi-Fi Direct Service (WFDS) Printer Discovery 406, may represent pre-association service discovery in that it occurs prior to initiation of a wireless docking session between the computing device 200 that is a wireless dockee and the peripheral computing device 320.

As part of the WFDS Printer Discovery 406, the ASP 204 may query the ASP 324 of peripheral computing device 320 for information on peripheral functions, including peripheral functions conforming, e.g., to a Printer peripheral function type, and available via the ASP 324. WFDS Printer Discovery 406 may include multiple communications for a communication flow. For example, the ASP 204 and ASP 324 may initially exchange device discovery communications. The ASP 204 may further send a service discovery query to query the ASP 324 for peripheral function information, or information on peripheral functions available to the ASP 324. Applicable peripheral functions may be available to the ASP 324 from an application also executing on peripheral computing device 320, e.g., the Print service 326.

The ASP 324, serving as a wireless docking host, may send a service discovery response that provides its peripheral function information. The ASP 324 may thereby advertise its peripheral functions in pre-association service discovery communications with the ASP 204 of computing device 200. These communications are pre-association in that they take place prior to initiation of a wireless docking session between the ASP 204 and the ASP 324. The ASP 204 may thus discover the peripheral functions associated with the ASP 324 from the service discovery response as part of the pre-association service discovery communications of WFDS printer discovery 406. Additional details of these pre-association service discovery communications are provided below.

The service discovery communications may be implemented in Data Link Layer, or layer 2 (L2), communications. The L2 communications may be conveyed over any of various types of physical layer (PHY) communication channels, including any of the Wi-Fi or WiGig standards and/or IEEE 802.11 protocols as discussed above. A service discovery query sent by the ASP 204 and the service discovery response sent by THE ASP 324 may use service discovery action frames. An example action frame may include a Media Access Control (MAC) header, a frame category, action details, and a frame check sequence (FCS). The action details in the service discovery query sent by the ASP 204 may include object identifier (OI) fields and query data fields. The ASP 204 may set an OI field in the service discovery action frame to 0x506F9A, i.e., the Organizationally Unique Identifier (OUI) of the Wi-Fi Alliance (WFA). The ASP 204 may also set additional fields in the service discovery action frame, such as an OUI subtype field and a service protocol type field. The ASP 204 may set the query data field of the service discovery query action frame to include a list of docking sub-element identifiers (ID's) to query for information on available docking sub-elements. In some examples, the ASP 204 may communicate with the ASP 324 using plaintext payloads that include SOAP requests and responses (e.g., in accordance with the SOAP specification defined at www.w3.org/TR/soap12-part1) and GENA (General Event Notification Architecture) notifications running on a packet-based transport layer protocol stack, while in other examples, the ASP 204 may communicate with docking the ASP 324 using a binary protocol running on a packet-based transport layer protocol stack, as further described below. The ASP 204 may also set a service transaction identifier (ID) in the query data field. Examples of the query data fields and the docking sub-element ID's for examples using SOAP and GENA payloads are shown as follows in Tables 2 and 3.

TABLE 2

Query Data Fields

| Field | Length (Octets) | Description |
|---|---|---|
| List of Docking Sub-element IDs | Variable | Requested Docking sub-elements as an array of sub-element IDs as per Table 2. |

TABLE 3

Docking Sub-element IDs

| Docking Sub-element ID | Description |
|---|---|
| . . . | . . . |
| 7 | Peripheral Function Information |

TABLE 3-continued

Docking Sub-element IDs

| Docking Sub-element ID | Description |
|---|---|
| 8 | Docking Host (ASP) SOAP URL |
| 9 | Docking Host (ASP) GENA URL |
| 10-255 | Reserved |

In some examples that may use a binary protocol instead of SOAP and GENA payloads, the ASP 204 may communicate with the ASP 324 without requiring the use of docking sub-element ID's 8 and 9 as listed in Table 2.

The ASP 324 may respond to receiving service discovery query from the ASP 204 by sending a service discovery response. The ASP 324 may include in the service discovery response a service discovery action frame with a service response data field that includes a list of requested docking sub-elements. The ASP 324 may include a service transaction ID in the service response type-length-value (TLV) element that matches the service transaction ID in the query data field of the service discovery query from the ASP 204, to ensure that the ASP 240 can associate the service discovery response with the previous service discovery query. The ASP 324 may set a docking information element (IE) in Docking Service Discovery action frames included in the service discovery response. In some examples, the ASP 204 may set the docking IE to include sub-elements as shown as follows in Table 4.

TABLE 4

Information Sub-elements in Docking IE in Docking Service Discovery Response

| Sub-element Name | Requirements |
|---|---|
| . . . | . . . |
| Peripheral Function Information | If requested, the Peripheral Function Information sub-element may be present in the Docking IE in the Docking Service Discovery Response action frames that ASP 324 transmits. |
| Docking Host (ASP) SOAP URL | If requested, the Docking Host (ASP) SOAP URL sub-element may be present in the Docking IE in the Docking Service Discovery Response action frames that ASP 324 transmits. |
| Docking Host (ASP) GENA URL | If requested, the Docking Host (ASP) SOAP URL sub-element may be present in the Docking IE in the Docking Service Discovery Response action frames that ASP 324 transmits. |
| . . . | . . . |

These docking information sub-elements provided by the ASP 324 in the service discovery response, i.e., the Peripheral Function Information Sub-element, the Docking Host (ASP) SOAP Uniform Resource Locator (URL) Sub-element, and the Docking Host (ASP) General Event Notification Architecture (GENA) URL Sub-element, are further described as follows. In examples that use a binary protocol, the ASP 324 may omit the docking host (ASP) SOAP URL and docking host (ASP) GENA URL from the information sub-elements from the docking information element in the docking service discovery response. In some examples that use the SOAP and GENA payloads, the computing device 200 and the peripheral device 320 may both send SOAP requests and responses to each other, and the computing device 200 may send GENA notifications to the peripheral device 320, where both the SOAP and GENA payloads may be sent over a packet-based transport layer protocol stack, in accordance with specifications such as Transmission Control Protocol/Internet Protocol (TCP/IP) or User Datagram Protocol/IP (UDP/IP), for example, to specified URLs, and potentially also to specified port numbers, such as TCP port number 80 (commonly associated with HTTP).

The Peripheral Function Information sub-element may provide the peripheral function (PF) information of peripherals hosted by peripheral device 320, specifically in this example, Print service 326. The Peripheral Function Information sub-element may have a data structure as shown in Table 5, with additional information on the listed fields thereafter.

TABLE 5

Peripheral Function Information Sub-element

| Field | Length (Octets) | Type |
|---|---|---|
| n_PFs | 1 | uimsbf |
| for (i = 0; i < n_PFs; i++) { | | |
| PF_ID | 2 | uimsbf |
| PF_type | 2 | uimsbf |
| PF_name | Variable | UTF-8_String( ) |
| PF_capability | Variable | UTF-8_String( ) |
| PF_state | 1 | uimsbf |
| n_PFPs | 1 | uimsbf |
| for (i = 0; I < n_PFPs; i++) { | | |
| PFP_ID | 1 | uimsbf |
| } | | |
| } | | |

The field "n_PFs" may contain the number of peripheral functions (PF's) hosted by the peripheral device 320 that generates this PF Status information data structure. Any one or more peripheral devices coupled to wireless dockee 110 (e.g., peripheral devices 140, 142, 144 of FIG. 1) may provide one or more peripheral functions.

The field "PF_ID" may contain the ID of a particular peripheral function (PF). As indicated by the line "for (i=0; i<n_PFs; i++)," the peripheral function information sub-element may include a peripheral function ID and associated information for each peripheral function ID for each of the "n_PFs" peripheral functions. The peripheral function ID may be unique for all peripheral functions that ASP 324 of peripheral device 320 currently hosts or centers or has ever hosted or centered. The ASP 324 may specify when a peripheral function is new and when the peripheral function is not new.

The field "PF_type" may indicate the peripheral function type of the peripheral function. An illustrative set of peripheral function types is listed below in Table 6.

The field "PF_name" may contain a user-friendly name of the peripheral function. This peripheral function name may be unique for all PFs available to the ASP 324. The format of the peripheral function name may be a UTF-8_String( ) structure, in some examples.

The field "PF_capability" may contain the capability of the peripheral function as reported by the ASP 324. The format of the peripheral function capability may also be a UTF-8_String( ) structure, in some examples.

The field "n_PFPs" may contain the number of Peripheral Function Protocols that can be used to support the use of the particular peripheral referred to by a given PF_ID. The field "PFP_ID" may contain the identifier (ID) of the Peripheral Function Protocol that can be used to support the use of the particular peripheral. An illustrative set of peripheral function protocols is listed below in Table 7. The field "PF_state" may contain the state of the peripheral function, such as with the example states defined below in Table 7.

TABLE 6

Peripheral Function Type

| PF Type | Description |
|---------|-------------|
| 0 | Mouse |
| 1 | Keyboard |
| 2 | Remote Control |
| 3 | Display |
| 4 | Speaker |
| 5 | Microphone |
| 6 | Storage |
| 7 | Printer |
| 8-65535 | Reserved |

TABLE 7

Peripheral Function Protocol Identifier

| PFP ID | Description |
|--------|-------------|
| 0 | Miracast |
| 1 | WiFi Serial Bus (WSB) |
| 2 | Bluetooth |
| 3 | WiGig Display Extension (WDE) |
| 4 | WiGig Serial Extension (WSE) |
| 5-255 | Reserved |

TABLE 8

PF_state values

| State | Value | Description |
|-------|-------|-------------|
| DISCONNECTED | 0x01 | The PF cannot be reached by the managing application service platform (ASP) and the managing ASP has no further information on how to make it available for docking. |
| SLEEP | 0x02 | The PF has let the managing ASP known that it is going to low-power mode or to be switched-off and that user action on the PF is required to make the PF available for docking again. On the other hand, if a PF can be woken up without requiring user action (e.g. through Wake-on-LAN or by changing the USB power state), the PF may not be given the PF_state "SLEEP". Such PFs may be given the state "NOT PAIRED" or "AVAILABLE". |
| NOT_PAIRED | 0x03 | The only thing that needs to be done for making this PF available for docking is that a user action is needed for pairing the PF with the managing ASP. |
| AVAILABLE | 0x04 | The PF is available for docking. |
| NOT_AVAILABLE | 0x05 | The PF is not available for docking. |

The Docking Service SOAP URL sub-element provides the URL of the SOAP command service for the docking protocol provided by the ASP 324. The Docking Service SOAP URL sub-element may have the data structure shown as follows in Table 9.

TABLE 9

Docking Service SOAP URL Sub-element

| Field | Length (Octets) | Type | Description |
|-------|-----------------|------|-------------|
| port_num | 2 | uimsbf | Port number |
| URL_path | Variable | UTF-8_String( ) | Substring of URL path, percent-encoded as per Internet Engineering Task Force (IETF) Request for Comment (RFC) 3986 |

The Docking Service GENA URL sub-element provides the URL of the GENA notification service for the docking protocol provided by the ASP 324. The Docking Service GENA URL sub-element may have the data structure shown as follows in Table 10.

TABLE 10

Docking Host GENA URL Sub-element

| Field | Length (Octets) | Type | Description |
|-------|-----------------|------|-------------|
| port_num | 2 | uimsbf | Port number |
| URL_path | Variable | UTF-8_String( ) | Substring of URL path, percent-encoded as per IETF RFC 3986 |

On receiving the peripheral function information of peripherals hosted by the peripheral device 320 and the ASP 324, the ASP 204 may return, in SearchResults( ) message 408 and to Print service 206, the subset of peripherals included in the peripheral function information that have a peripheral function type of Printer (e.g., type 7 in the illustrative set of peripheral function types listed in Table 6). The Print service 206 may thus discover the peripheral functions associated with the peripheral computing device 320 from the service discovery response as part of the pre-association service discovery communications. The Print service 206 may provide the subset of peripherals received in Results message 410 to the WDS 214.

The WDS 214 may consolidate peripheral functions discovered by operation of the ASP 204, as well as other peripheral functions that may communicate using various other Peripheral Function Protocols (PFPs) such as WSB, Bluetooth, and Miracast (described in further detail below with respect to FIGS. 6A-6C), and return a representation of the peripheral functions in message 412 to the application 216, which may then select a subset of the peripheral functions for configuration and use, as described in further detail below with respect to FIG. 5B. In this way, the WDS 214 may provide, to the application 216, a unified interface by which the application 216 may discover one or more peripheral functions offered by peripheral devices, e.g., peripheral device 320, with which computing device 200 as a wireless dockee may directly dock using a wireless docking session that is unmediated by a wireless docking center.

Turning now to FIG. 5B, the application 216 may select a subset of the discovered peripheral functions for use. The application 216 may then direct, using ConfigurePeripherals( ) method 420, the WDS 214 to configure the subset of the discovered peripheral functions for use by the application 216. The ConfigurePeripherals( ) method 420 may include parameter(s) for listing the subset of the discovered peripheral functions for use by the application 216. The ConfigurePeripherals( ) method 420 may represent the ConfigurePeripherals( ) method listed in Table 1, above, for the API 226 of the wireless docking communications stack 201 of computing device 200.

The wireless docking service 214 may be configured with connectivity configuration information for peripheral devices establishing data (or "payload") connections by the computing device 200. In some instances, a payload connection may include a Wi-Fi peer-to-peer (P2P) connection, and the connectivity configuration information may include a P2P Group Credential. For establishing a Wi-Fi P2P connection in instances in which a persistent P2P group is not available, the connectivity configuration information may include a Group Owner Intent, Operating Channel, Intended P2P Interface Address, Channel List, P2P Group ID, and the aforementioned P2P Group Credential. For establishing a Wi-Fi P2P connection in instances in which a persistent P2P group is available, the connectivity configuration information may include an Operating Channel, P2P Group BSSID, Channel List, and P2P Group ID.

The WDS 214 may use ConfigurationCredential( ) method 422 to provide the connectivity configuration information for establishing payload connections by the computing device 200 to ASP 204, which consolidates session setup for, potentially, multiple peripheral functions and selected peripheral function protocols for the corresponding peripheral functions. In particular, the WDS 214 may provide the P2P Group Credential to ASP 204 using ConfigurationCredential( ) method 422.

The WDS 214 may further provide, using ConfigurationCredential( ) method 422, additional information relating to payload connection negotiation, such as a payload connection protocol, a selected peripheral function protocol for each of the selected subset of peripheral functions, and identifiers for the selected peripheral functions that use the payload connection protocol and the payload function protocol.

The application 216 subsequently invokes the UsePeripherals( ) method 424 of WDS 214 to request the user of the peripherals and a unified docking session that is a common context for the multiple selected peripheral functions for the application 216. The UsePeripherals( ) method 424 may include parameter(s) for listing the subset of the selected peripheral functions sought for use by the application 216. The selected peripheral functions may be identified using the example Peripheral Function Type identifiers of Table 6 in some instances. The UsePeripherals( ) method 424 may represent the UsePeripherals( ) method listed in Table 1, above, for the API 226 of the wireless docking communications stack 201 of computing device 200.

In the illustrated example, the WDS 214, in turn, identifies the Print service 206 as one of the selected peripheral functions. The WDS 214 may identify the Print service 206 using the example identifier for the Printer Peripheral Function Type identifier listed in Table 6. The WDS 214 accordingly directs, using Start message 426, Print service 206 to initiate a Printer peripheral function session with the peripheral device 320 that provides the Printer peripheral function. Print service 206 requests to connect to an Application Service Platform session by invoking a ConnectSession( ) method 428 of ASP 204.

The ASP 204 establishes, using ASP session setup procedure 430, an Application Service Platform session with ASP 324 of peripheral device 320 according to connectivity configuration information provided by WDS 214. The Application Service Platform session may serve as a common ASP session for multiple peripheral functions and corresponding peripheral function protocols.

Upon successful establishment of an ASP session with the ASP 324 of peripheral device 320, the ASP 204 may notify the Print service 206 that the ASP session is established by invoking a SessionConnected( ) method 432. The Print service 206, in turn, notifies the WDS 214 of the successful establishment of the ASP session by returning a Success message 434 to the WDS 214 in response to the Start message 426 that initiated the Printer peripheral function session with the peripheral device 320.

Subsequently, the WDS 214 may request, by invoking the GetConnectionConfiguration( ) method 436, connectivity configuration information from the ASP 204 that the ASP 204 may have negotiated with the ASP 324 during the ASP session setup procedure 430. The ASP 204 may respond to the invocation of the GetConnectionConfiguration( ) method 436 by returning connectivity configuration information. The connectivity configuration information may include, e.g., the payload connection protocol, connectivity configuration information of the payload connection agreed to by both the ASP 204 of computing device 200 and the ASP 324 of peripheral device 320, the peripheral function protocol, and an identifier for the peripheral function type ("Printer" in this example, cf. Table 6) of the ASP session established for the Print service 206 data payload connection. For a Wi-Fi P2P connection that does not use a persistent P2P group, the connectivity configuration information of the payload connection may include an operating channel, channel list, and P2P Group ID, for example. For a Wi-Fi P2P connection that uses a persistent P2P group, the connectivity configuration information of the payload connection may include an operating channel, P2P Group BSSID, and channel list, for example.

The WDS 214 consolidates one or more peripheral functions and corresponding payload connections into a common context that is identifiable by a docking session identifier. In some cases, as in the example of FIGS. 5A-5C, the ASP 204 may organize one or more peripheral functions protocols for communicating with peripheral devices that offer peripheral functions to computing device 200. The WDS 214 may then address the one or more consolidated peripheral functions using the common context identified by the docking session identifier. Because application 216 instigates the selection and configuration of the one or more peripheral functions consolidated by the WDS 214, the WDS 214 provides the docking session identifier ("[docking session]") to application 216 in message 440.

Subsequently, application 216 may use the docking session identifier to address the payload connection established by the ASP 204 with the ASP 324 in order to exchange data and, in some cases control information, with the peripheral Print service 326 by data message exchanges 442 using the negotiated peripheral function protocol. In this way, the WDS 214 may provide, to the application 216, a unified interface by which the application 216 may discover, configure, and select a subset of the one or more peripheral functions offered by peripheral devices, e.g., peripheral device 320, with which computing device 200 as a wireless dockee may directly dock using a wireless docking session that is unmediated by a wireless docking center.

FIG. 5C illustrates additional example operations of the peripheral device 320 to establish a payload connection for a Printer peripheral function. The communication stack 321 of peripheral device 320 includes an optional wireless docking service 328 layer to advertise docking content using Advertise Docking Content message 450. The docking content may include the set of peripheral functions and associated status information. The Print service 326 of the peripheral device 320 may notify the ASP 324 of the availability of a Printer peripheral function type on the peripheral device 320 using AdvertisePeripheral( ) method 452. As a result, the ASP 324 may respond favorably to the WFDS Printer Discovery procedure 406, in that the ASP 324 may respond to service discovery messages issued by the ASP 204 of the computing device 200 with peripheral function information for the Printer peripheral function.

As described above with respect to FIG. 5B, the ASP 204 and the ASP 324 perform the ASP session setup procedure 430. Upon successful connection of an ASP session between the ASP 204 and the ASP 324, the ASP 324 may notify the Print service 326 that the ASP session is established by invoking a SessionConnected( ) method 454.

Figure 6B:
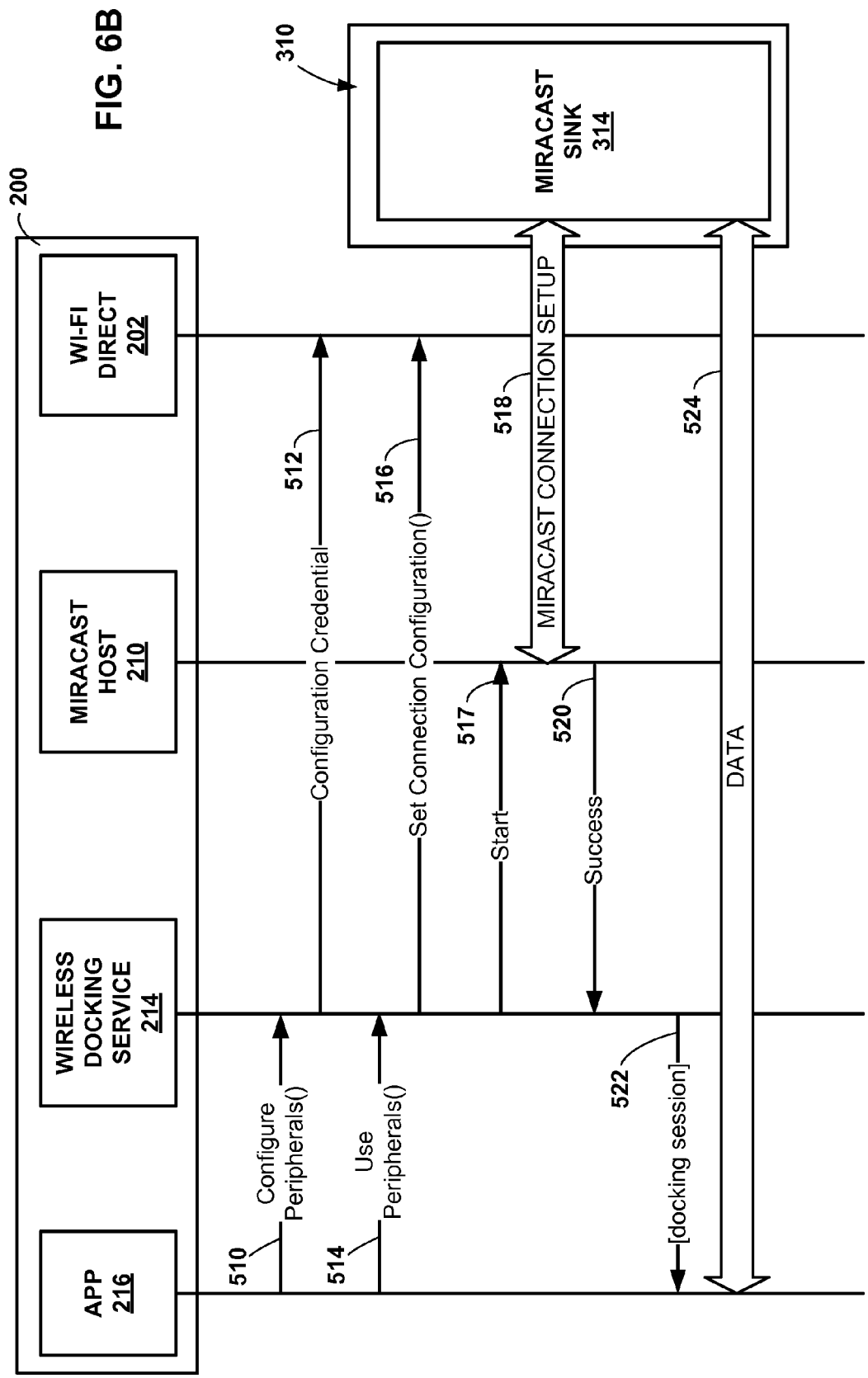
Figure 6C:
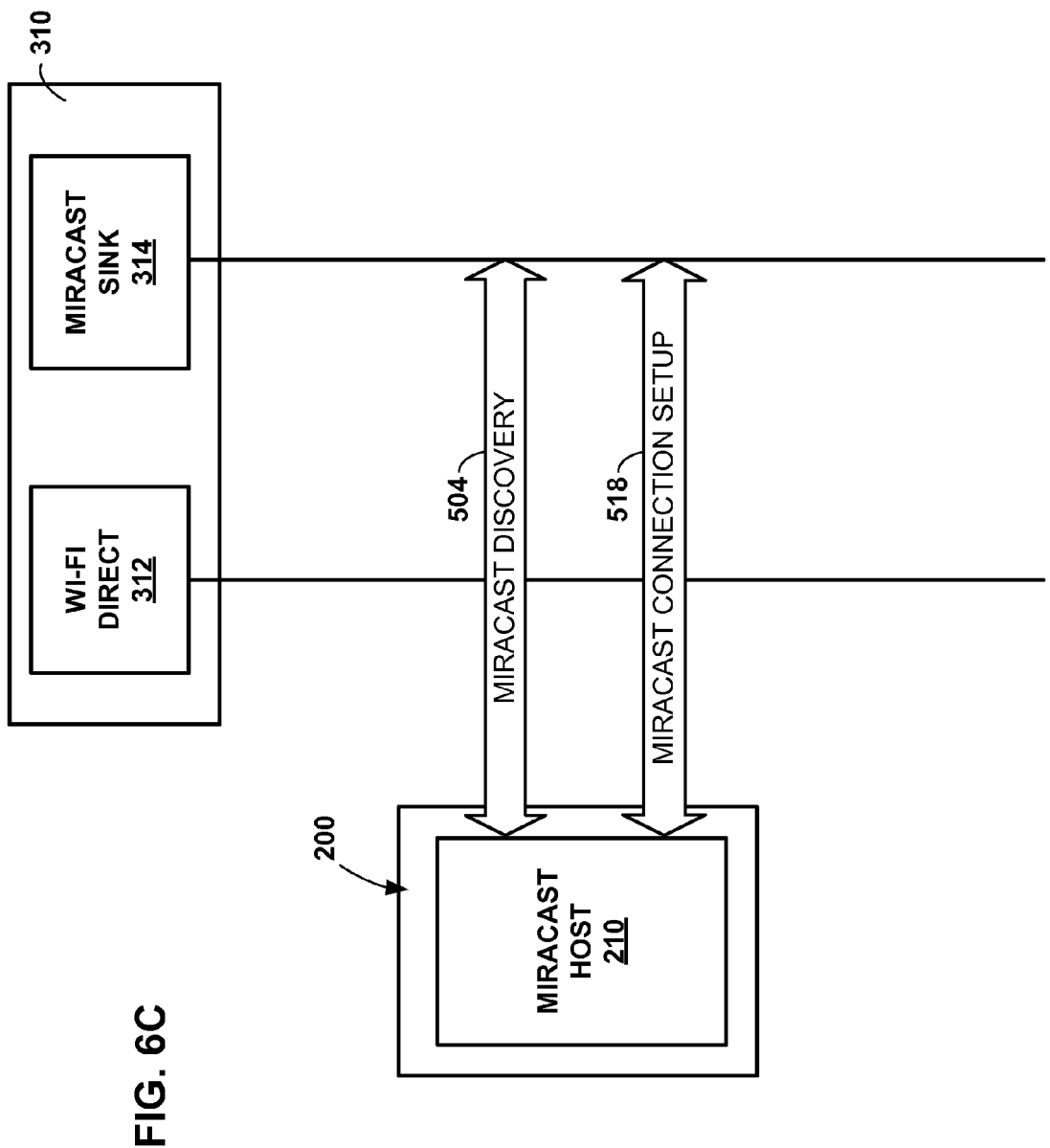

FIGS. 6A-6C depict a call flow diagram for example call flows by which a user application executing on a computing device uses an wireless docking service to exchange communications with peripherals, unmediated by a wireless docking center, to discover, configure, and select peripherals to establish and operate a consolidated docking session, in accordance with one or more examples of this disclosure. In this example, the computing device 200 operating as a wireless dockee engages a peripheral function that communicates using the Miracast peripheral function protocol (cf. Table 7).

The computing device 200 includes components of the example wireless docking communications stack 201 illustrated in FIG. 3, specifically, the wireless docking service 214, the Miracast host 210, the Application Service Platform (ASP) 204, and the Wi-Fi Direct layer 202. The application 216 executing on computing device 200 may invoke the wireless docking service 214 to establish a consolidated docking session including one or more peripheral devices, e.g., peripheral device 310 that includes a Miracast sink 314.

In the illustrated example, the user application 216 of computing device 200 queries, by invoking DiscoverPeripherals( ) method 500, the WDS 214 of wireless docking communications stack 201 of computing device 200 to discover peripheral devices. The DiscoverPeripherals( ) method 500 may represent the DiscoverPeripherals( ) method listed in Table 1, above, for the API 226 of the wireless docking communications stack 201 of computing device 200. In addition, the DiscoverPeripherals( ) method 400 and the DiscoverPeripherals( ) method 500 may represent the same operation in that application 216 is seeking to discover a plurality of peripheral functions at once.

The WDS 214 may issue communications for different sub-layers corresponding to different peripheral services. In this example, the WDS 214 performs device discovery. As part of device discovery, the WDS 214 may send one or more communications to sub-layers that include directives to discover available peripherals. Here, the WDS 214 uses Discover message 502 by communication interface 220 to request the Miracast Host 210 to request service discovery for a Miracast service, that is, a Miracast-capable peripheral function type (e.g., Display) that uses the Miracast peripheral function protocol. Again, this is merely one example of device discovery for a peripheral.

The Miracast host 210 executes a Miracast discovery procedure 504 to discover available Miracast services, which in this example are provided peripheral device 310 having a Miracast sink 314. The Miracast sink 314 may return peripheral function information to the Miracast host 210 during the Miracast discovery procedure 504. The Miracast Host 210 may return, in Results message 506 and to the WDS 214, the subset of peripherals included in the peripheral function information that have a peripheral function protocol of type Miracast. Although only one peripheral device 310 having a Miracast sink 314 are illustrated in FIG. 6A, in some cases multiple such peripheral devices may be available to sink data using the Miracast peripheral function protocol.

The WDS 214 may consolidate peripheral functions that use the Miracast peripheral function protocol discovered by operation of the Miracast host 210, as well as other peripheral functions that may communicate using various other Peripheral Function Protocols (PFPs) such as WSB, and Bluetooth, and return a representation of the peripheral functions ("[peripherals]") in message 508 to the application 216, which may then select a subset of the peripheral functions for configuration and use. In some cases, message 508 of FIG. 6A and message 42 of FIG. 5A may represent the same message in that the WDS may discover a plurality of peripheral functions at once and return the representation of discovered peripheral functions in a single message. The WDS 214 may in this way provide, to the application 216, a unified interface by which the application 216 may discover one or more peripheral functions offered by peripheral devices, e.g., peripheral device 310, with which computing device 200 as a wireless dockee may directly dock using a wireless docking session that is unmediated by a wireless docking center.

Turning now to FIG. 6B, the application 216 may select a subset of the discovered peripheral functions for use. The application 216 may then direct, using ConfigurePeripherals( ) method 510, the WDS 214 to configure the subset of the discovered peripheral functions for use by the application 216. The ConfigurePeripherals( ) method 510 may include parameter(s) for listing the subset of the discovered peripheral functions for use by the application 216 including, in this case, a peripheral function that uses the Miracast peripheral function protocol. The ConfigurePeripherals( ) method 510 may represent the ConfigurePeripherals( ) method listed in Table 1, above, for the API 226 of the wireless docking communications stack 201 of computing device 200. In addition, the ConfigurePeripherals( ) method 510 may represent the ConfigurePeripherals method 420 of FIG. 5B yet including any parameter(s) for listing the peripheral function making use of the Miracast peripheral function protocol.

The wireless docking service 214 may be configured with connectivity configuration information for peripheral devices establishing data (or "payload") connections by the computing device 200. In some instances, a payload connection may include a Wi-Fi peer-to-peer (P2P) connection, and the connectivity configuration information may include a P2P Group Credential. For establishing a Wi-Fi P2P connection in instances in which a persistent P2P group is not available, the connectivity configuration information may include a Group Owner Intent, Operating Channel, Intended P2P Interface Address, Channel List, P2P Group ID, and the aforementioned P2P Group Credential. For establishing a Wi-Fi P2P connection in instances in which a persistent P2P group is available, the connectivity configuration information may include an Operating Channel, P2P Group BSSID, Channel List, and P2P Group ID.

The WDS 214 may use Configuration Credential message 512 to provide the connectivity configuration information for establishing payload connections by the computing device 200 to Wi-Fi Direct 202, which may configure a dedicated WFD channel for a Miracast connection (described below). The application 216 subsequently invokes the UsePeripherals( ) method 514 of WDS 214 to request a unified docking session that is a common context for the multiple selected peripheral functions for the application 216. The UsePeripherals( ) method 424 may include parameter(s) for listing the subset of the selected peripheral functions sought for use by the application 216. The selected peripheral functions may be identified using the example Peripheral Function Type identifiers of Table 6 in some instances. The UsePeripherals( ) method 514 may represent the UsePeripherals( ) method listed in Table 1, above, for the API 226 of the wireless docking communications stack 201 of computing device 200. In addition, the UsePeripherals( ) method 514 may represent the UsePeripherals( ) method 424 of FIG. 5B.

In the illustrated example, the WDS 214, in turn, identifies one of the selected peripheral functions as using the Miracast peripheral function protocol. The WDS 214 may identify the one of the selected peripheral functions using the example identifier for the Peripheral Function Protocol Identifier ("PFP ID") listed in Table 7 for Miracast. The WDS 214 accordingly directs, using SetConnectionConfiguration( ) method 516, the Wi-Fi Direct 202 to establish a WFD channel for establishing a Miracast connection. The WDS 214 further issues Start message 517 to the Miracast host 210 to direct the Miracast host 210 to perform a Miracast connection setup procedure 518 with Miracast sink 314 to establish a payload connection that uses the Miracast peripheral function protocol.

Upon successful establishment of the Miracast connection with the Miracast sink 314 of peripheral device 310, the Miracast host 210 may notify the WDS 214 of the successful establishment of the Miracast connection by returning a Success message 520 to the WDS 214 in response to the Start message 517 that initiated the Miracast connection with the peripheral device 310.

The WDS 214 consolidates one or more peripheral functions and corresponding payload connections into a common context that is identifiable by a docking session identifier. The WDS 214 may then address the one or more consolidated peripheral functions using the common context identified by the docking session identifier. Because application 216 instigates the selection and configuration of the one or more peripheral functions consolidated by the WDS 214, the WDS 214 provides the docking session identifier ("[docking session]") to the application 216 in the message 522. The message 522 may represent the message 440 of FIG. 5B and include the same identifier in instances where the WDS 214 establishes multiple payload connections for a Printer peripheral function and a Miracast-capable peripheral function in parallel.

Subsequently, application 216 may use the docking session identifier to address the payload connection established by the Miracast host 210 with Miracast sink 314 in order to exchange data and, in some cases control information, with the Miracast sink by data message exchanges 524 using the payload connection. In this way, the WDS 214 may provide, to the application 216, a unified interface by which the application 216 may discover, configure, and select a subset of the one or more peripheral functions offered by peripheral devices, e.g., peripheral device 310, with which computing device 200 as a wireless dockee may directly dock using a wireless docking session that is unmediated by a wireless docking center.

FIG. 6C illustrates example operations of the Miracast sink 314 of the peripheral device 310 to establish a Miracast payload connection with the Miracast host 210 of computing device 200. Miracast sink 314 responds to indicate an available Miracast service during Miracast discovery 504. In addition, Miracast sink 314 participates in establishing a Miracast payload connection with Miracast host 210 during Miracast connection setup procedure 518 with computing device 200.

The computing device 200 may create the persistent WDN for future use by the application 216, which may include simplifying and accelerating the process of establishing and operating future wireless docking sessions between computing device 200 and peripheral devices (e.g. peripheral device 140, 142, and 144 of FIGS. 1 and 2), for example. The WDN configuration data may include the peripheral functions (PF) used in a particular wireless docking session that does not involve a wireless docking center, and the peripheral function protocol (PFP) and payload connection protocol (PCP) information for each peripheral function. A persistent P2P group may be associated with a persistent WDN, although a persistent WDN is not necessarily associated with a persistent P2P group, in some examples.

In some examples, the WDS 214 of computing device 200 may store a persistent wireless docking environment (WDN) for the future use of the application 216. During the pre-association service discovery procedure, the peripheral devices may include a docking information element (IE) in a service discovery response that may include a wireless docking (WDCK) capability sub-element. The WDS 214 may set a corresponding WDCK capability sub-element in part to indicate that it has the capability to store a persistent WDN for the future use of the application 216. If the WDS 214 has the capability to store a persistent WDN, then application 216 may initiate a transaction to store the persistent WDN with the WDS 214. Example call flow diagrams for the setup and use of a persistent WDS are shown in FIGS. 7-11.

FIG. 7 depicts a call flow diagram for example call flows for creating a persistent wireless docking environment, in accordance with techniques described in this disclosure. The procedure 600 for discovering and configuring peripherals may correspond in many respects to the procedures for discovering and configuring peripheral functions using direct connections to peripheral devices, i.e., without a wireless docking controller. That is, the procedure 600 may incorporate features described with respect to FIGS. 5A-5C and 6A-6C for discovering and configuring peripheral functions for a Printer peripheral function type and a Miracast-capable peripheral function, respectively.

After directing the WDS 214 to configure selected peripherals discovered by the WDS 214, the application 216 may request the WDS 214 to create a persistent WDN (alternatively referred to as a "wireless docking environment") by invoking the CreateWirelessDockingEnvironment( ) method 602. The CreateWirelessDockingEnvironment( ) method 602 may represent the CreateWDN( ) method listed in Table 1, above, for the API 226 of the wireless docking communications stack 201 of computing device 200.

The WDS 214 may respond to the invocation of its exposed CreateWirelessDockingEnvironment( ) method 602 by creating and storing the persistent WDN as requested based at least on the discovered, selected, and configured peripherals for a docking session. To create and store the persistent WDN, the WDS 214 may store peripheral function configuration information for the selected peripheral functions, which may include the peripheral function type, corresponding peripheral function protocol, and payload connection type (e.g., one of IEEE 802.11n, 802.11ac, 802.11ad) for each of the selected peripheral functions. The WDS 214 may in some instances further store an identifier for application 216 and/or a docking session identifier for the persistent WDN. For a persistent WDN to be stored by the WDS 214, it will be understood that in other examples, the persistent WDN and/or the persistent WDN configuration data may equivalently be stored by another device accessible to computing device 200, which may include proximate or remote storage resources in various examples.

Upon creating and storing a persistent wireless docking environment in response to the invocation of CreateWirelessDockingEnvironment( ) method 602, the WDS 214 returns a handle for the persistent WDN ("[Wireless Docking Environment]") to the application 216. As described below with respect to FIGS. 10 and 11, the application 216 may use the handle to avoid discovering, selecting, and configuring peripheral functions encompassed by the persistent WDN.

FIG. 8 depicts a call flow diagram for example call flows for discovering available peripherals and using the discovered peripherals to create a persistent wireless docking environment, in accordance with techniques described in this disclosure. In this example, the application 216 invokes the DiscoverWirelessDockingEnvironment( ) method 612 of the WDS 214 to direct the WDS 214 to discover available peripherals and return the peripherals to the application 216 as a wireless docking environment. The DiscoverWirelessDockingEnvironment ( ) method 612 may represent the DiscoverWDN ( ) method listed in Table 1, above, for the API 226 of the wireless docking communications stack 201 of computing device 200.

The WDS 214, in response, performs the service discovery procedures in conjunction with the Print service 206 and the ASP 204 to discover the Printer peripheral function provided by peripheral device 320. The service discovery procedures include Discover message 614 from the WDS 214 to the Print service 206, the SeekService( ) method 616 of the ASP 204 invoked by the Print service 206, the WFDS Printer Discovery procedure 618 between the ASP 204 and the ASP 324, the SearchResult( ) method 620 to return the results of the SeekService( ) method 616 to the Print service 206, and the Results message 622 to return the results of the Discover message 614 to the WDS 214. The service discovery procedures may be substantially similar to the Discover message 402, SeekService( ) message 404, WFDS Printer Discovery procedure 406, SearchResult( ) message 408, and Results message 410 procedures as illustrated and described with respect to FIG. 5A.

Upon receiving the Results message 622, the WDS 214 may store the received peripheral function information by creating and storing a persistent WDN that includes the peripheral function information for the discovered peripheral functions (in this example, the Printer peripheral function). The WDS 214 may then return a handle for the persistent WDN ("[Wireless Docking Environment]") to the application 216 using message 624. As described below with respect to FIGS. 10 and 11, the application 216 may use the handle to avoid again discovering, selecting, and configuring peripheral functions encompassed by the persistent WDN.

FIG. 9 depicts a call flow diagram for example call flows for discovering available peripherals and using the discovered peripherals to create a persistent wireless docking environment, in accordance with techniques described in this disclosure. In this example, the application 216 invokes the DiscoverWirelessDockingEnvironment( ) method 650 of the WDS 214 to direct the WDS 214 to discover available peripherals and return the peripherals to the application 216 as a wireless docking environment. The DiscoverWirelessDockingEnvironment( ) method 650 may represent the DiscoverWDN( ) method listed in Table 1, above, for the API 226 of the wireless docking communications stack 201 of computing device 200. In addition, the DiscoverWirelessDockingEnvironment( ) method 650 may represent the DiscoverWirelessDockingEnvironment( ) method 612 of FIG. 8 in that the application may invoke the DiscoverWirelessDockingEnvironment( ) method 612 of the WDS 214 to discovery multiple peripheral functions in parallel.

The WDS 214, in response, performs the service discovery procedures in conjunction with the Miracast host 210 to discover the Miracast-capable peripheral function provided by peripheral device 310. The service discovery procedures include Discover message 652 from the WDS 214 to the Miracast host 210, Miracast Discovery procedure 654, and the Results message 656 to return the results of the Discover message 656 to the WDS 214. The service discovery procedures may be substantially similar to the Discover message 502, Miracast Discovery procedure 504, and Results message 506 procedures as illustrated and described with respect to FIG. 6A.

Upon receiving the Results message 656, the WDS 214 may store the received peripheral function information by creating and storing a persistent WDN that includes the peripheral function information for the discovered peripheral functions (in this example, the Miracast-capable Miracast host 210). The WDS 214 may then return a handle for the persistent WDN ("[Wireless Docking Environment]") to the application 216 using message 658. Message 658 may represent the message 624 of FIG. 8 in some instances.

Figure 10:
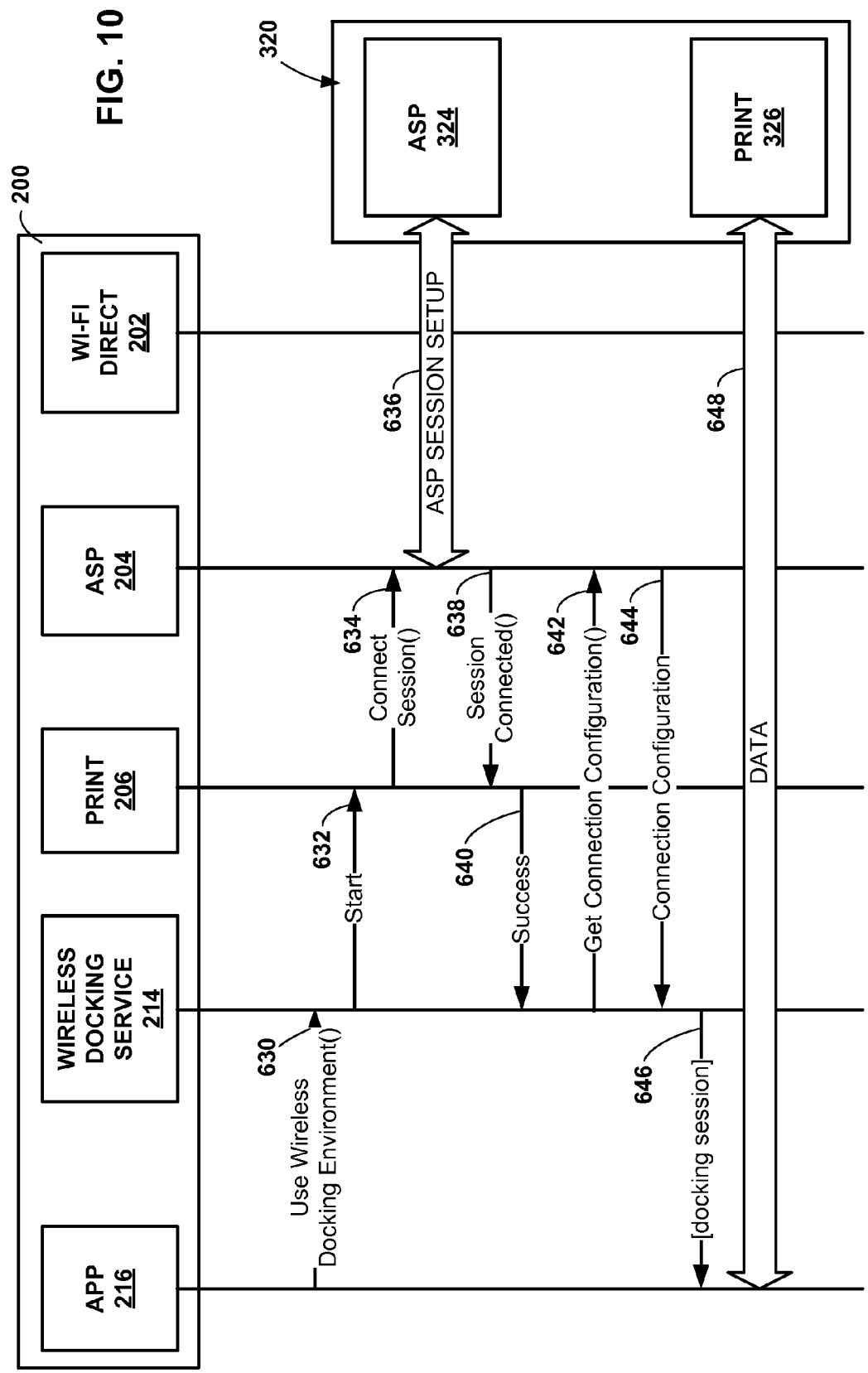
FIG. 10 depicts a call flow diagram for example call flows for using a previously persisted wireless docking environment that includes one or more peripheral functions, in accordance with techniques described in this disclosure.

FIG. 10 depicts a call flow diagram for example call flows for using a previously persisted wireless docking environment that includes one or more peripheral functions, in accordance with techniques described in this disclosure. The application 216 may read from persistent storage, from a memory of computing device 200, or otherwise obtain a handle for a WDN. To request use of the WDN, the application 216 may then provide the handle for the WDN to the WDS 214 by invoking the UseWirelessDockingEnvironment( ) method 630 of the WDS 214. The UseWirelessDockingEnvironment( ) method 630 may represent the UseWDN( ) method listed in Table 1, above, for the API 226 of the wireless docking communications stack 201 of computing device 200

In response, the WDS 214 establishes payload connections for the peripheral functions associated with the WDN identified by the WDN handle. As described and illustrated with respect to FIG. 5B, the WDS 214 establishes an ASP session with the ASP 324 using ASP 204 and establishes a payload connection for the application 216 to Print service 326. WDS 214 returns, using docking session message 646, a docking session ("[docking session]") by which user application may engage the peripheral function(s) provided by the peripheral device, which may include exchanging data for the peripheral function(s) between user application 216 and the peripheral device 320. By enabling the use of a persistent WDN in this way, the WDS 214 may repeatedly establish payload connections with the peripheral functions associated with the persistent WDN without having to perform pre-association service discovery procedures and peripheral function configuration procedures, for the information otherwise exchanged from these procedures is already stored in the persistent WDN. The WDS 214 may also avoid repeatedly providing, to the appropriate communication layer of the wireless docking communications stack 201, a configuration credential for configuring the peripheral function.

Figure 11:
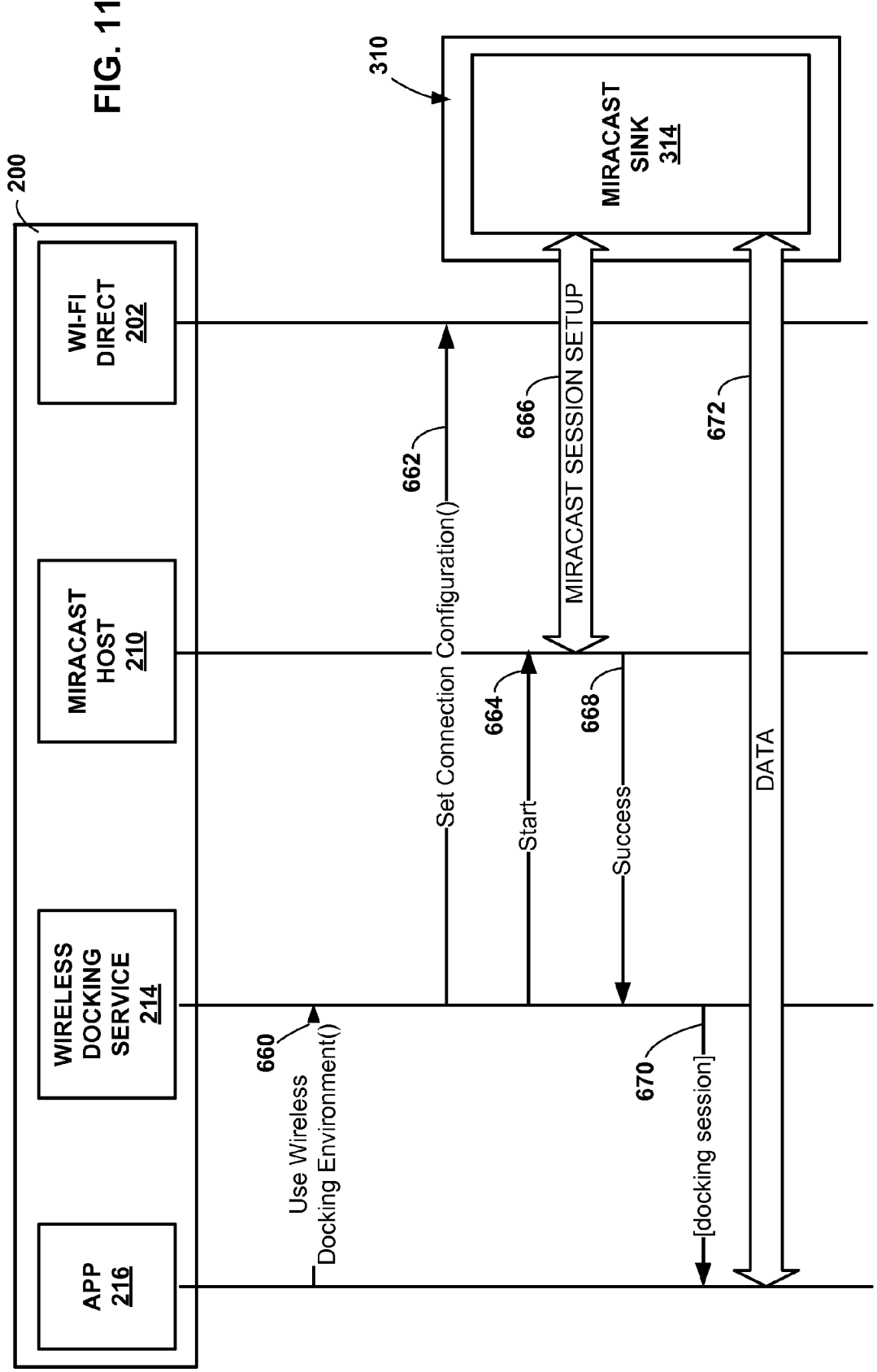
FIG. 11 depicts a call flow diagram for example call flows for using a previously persisted wireless docking environment that includes one or more peripheral functions, in accordance with techniques described in this disclosure.

FIG. 11 depicts a call flow diagram for example call flows for using a previously persisted wireless docking environment that includes one or more peripheral functions, in accordance with techniques described in this disclosure. The application 216 may read from persistent storage, from a memory of computing device 200, or otherwise obtain a handle for a WDN. The application 216 may then provide the handle for the WDN to the WDS 214 by invoking the UseWirelessDockingEnvironment( ) method 660 of the WDS 214. The UseWirelessDockingEnvironment( ) method 660 may represent the UseWDN( ) method listed in Table 1, above, for the API 226 of the wireless docking communications stack 201 of computing device 200. In addition, UseWirelessDockingEnvironment( ) method 660 may represent the UseWirelessDockingEnvironment( ) method 630 of FIG. 10, for the persisted WDN may include multiple different peripheral functions usable by a single invocation of the UseWirelessDockingEnvironment( ) method of the WDS 214.

In response, the WDS 214 establishes payload connections for the peripheral functions associated with the WDN identified by the WDN handle. As described and illustrated with respect to FIG. 6B, the WDS 214 establishes a Miracast connection for the application 216 to Miracast sink 314. WDS 214 returns, using docking session message 670, a docking session ("[docking session]") by which user application may engage the peripheral function(s) provided by the peripheral device, which may include exchanging data for the peripheral function(s) between user application 216 and the peripheral device 310. By enabling the use of a persistent WDN in this way, the WDS 214 may repeatedly establish payload connections with the peripheral functions associated with the persistent WDN without having to perform pre-association service discovery procedures and peripheral function configuration procedures, for the information otherwise exchanged from these procedures is already stored in the persistent WDN. The WDS 214 may also avoid repeatedly providing, to the appropriate communication layer of the wireless docking communications stack 201, a configuration credential for configuring the peripheral function.

Figure 12:
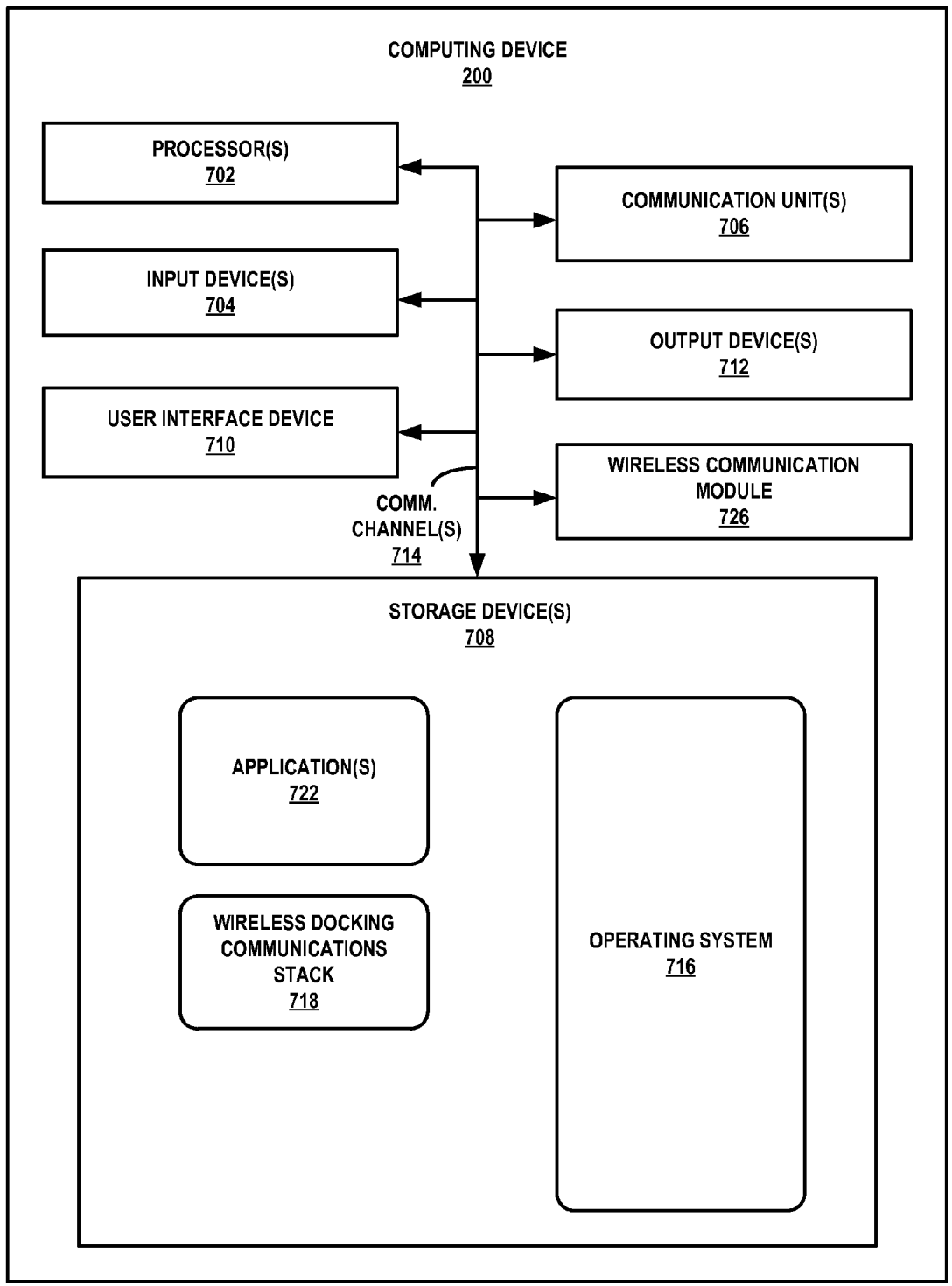
FIG. 12 is a block diagram illustrating an example instance of a computing device operating according to techniques described in this disclosure.

FIG. 12 is a block diagram illustrating an example instance of a computing device 200 operating according to techniques described in this disclosure. FIG. 12 illustrates only one particular example of computing device 200, and other examples of computing device 200 may be used in other instances. Although shown in FIG. 12 as a stand-alone computing device 200 for purposes of example, a computing device may be any component or system that includes one or more processors or other suitable computing environment for executing software instructions and, for example, need not necessarily include one or more elements shown in FIG. 12 (e.g., input devices 704, user interface devices 710, output devices 712).

As shown in the specific example of FIG. 12, computing device 700 includes one or more processors 702, one or more input devices 704, one or more communication units 706, one or more output devices 712, one or more storage devices 708, and user interface (UI) device 710, and wireless communication module 726. Computing device 700, in one example, further includes wireless docking communications stack 718, authorization module 720, one or more applications 722, and operating system 716 that are executable by computing device 700. Each of components 702, 704, 706, 708, 710, 712, and 726 are coupled (physically, communicatively, and/or operatively) for inter-component communications. In some examples, communication channels 714 may include a system bus, a network connection, an inter-process communication data structure, or any other method for communicating data. As one example in FIG. 12, components 702, 704, 706, 708, 710, 712, and 726 may be coupled by one or more communication channels 714. Wireless docking communications stack 718, authorization module 720, and one or more applications 722 may also communicate information with one another as well as with other components in computing device 700. While illustrated as separate modules, any one or more of modules 718 or 720 may be implemented as part of any of applications 722.

Processors 702, in one example, are configured to implement functionality and/or process instructions for execution within computing device 700. For example, processors 702 may be capable of processing instructions stored in storage device 708. Examples of processors 702 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 708 may be configured to store information within computing device 700 during operation. Storage device 708, in some examples, is described as a computer-readable storage medium. In some examples, storage device 708 is a temporary memory, meaning that a primary purpose of storage device 708 is not long-term storage. Storage device 708, in some examples, is described as a volatile memory, meaning that storage device 708 does not maintain stored contents when the computer is turned off. Examples of volatile memories include random access memories (RAM), dynamic random access memories (DRAM), static random access memories (SRAM), and other forms of volatile memories known in the art. In some examples, storage device 708 is used to store program instructions for execution by processors 702. Storage device 708, in one example, is used by software or applications running on computing device 700 to temporarily store information during program execution.

Storage devices 708, in some examples, also include one or more computer-readable storage media. Storage devices 708 may be configured to store larger amounts of information than volatile memory. Storage devices 708 may further be configured for long-term storage of information. In some examples, storage devices 708 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication units 706. Computing device 700, in one example, utilizes communication unit 706 to communicate with external devices via one or more networks, such as one or more wireless networks. Communication unit 706 may be a network interface card, such as an Ethernet card, an optical transceiver, a radio frequency transceiver, or any other type of device that can send and receive information. Other examples of such network interfaces may include Bluetooth, 7G and Wi-Fi radios computing devices as well as Universal Serial Bus (USB). In some examples, computing device 700 utilizes communication unit 706 to wirelessly communicate with an external device such as a server.

In addition, the computing device 700 may include wireless communication module 726. As described herein, wireless communication module 726 may be active hardware that is configured to communicate with other wireless communication devices. These wireless communication devices may operate according to Bluetooth, Ultra-Wideband radio, Wi-Fi, or other similar protocols. In some examples, wireless communication module 726 may be an external hardware module that is coupled with computing device 700 via a bus (such as via a Universal Serial Bus (USB) port). Wireless communication module 726, in some examples, may also include software which may, in some examples, be independent from operating system 716, and which may, in some other examples, be a sub-routine of operating system 716.

Computing device 700, in one example, also includes one or more input devices 704. Input device 704, in some examples, is configured to receive input from a user through tactile, audio, or video feedback. Examples of input device 704 include a presence-sensitive display, a mouse, a keyboard, a voice responsive system, video camera, microphone or any other type of device for detecting a command from a user.

One or more output devices 712 may also be included in computing device 700. Output device 712, in some examples, is configured to provide output to a user using tactile, audio, or video stimuli. Output device 712, in one example, includes a presence-sensitive display, a sound card, a video graphics adapter card, or any other type of device for converting a signal into an appropriate form understandable to humans or machines. Additional examples of output device 712 include a speaker, a cathode ray tube (CRT) monitor, a liquid crystal display (LCD), or any other type of device that can generate intelligible output to a user. In some examples, user interface (UI) device 710 may include functionality of input device 704 and/or output device 712.

Computing device 700 may include operating system 716. Operating system 716, in some examples, controls the operation of components of computing device 700. For example, operating system 716, in one example, facilitates the communication of wireless docking communications stack 718, and application 722 with processors 702, communication unit 706, storage device 708, input device 704, user interface device 710, wireless communication module 726, and output device 712. Wireless docking communications stack 718 and application 722 may also include program instructions and/or data that are executable by computing device 700. As one example, modules 718, 720, and 722 may include instructions that cause computing device 700 to perform one or more of the operations and actions described in the present disclosure. Wireless docking communications stack 718 and application 722 may represent wireless docking communications stack 201 and application 216 of FIG. 3, for example.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of wireless docking, the method comprising:
   receiving, from a user application and with a wireless docking service of a wireless docking communications stack executing on a computing device, a request to discover one or more peripheral functions within wireless communication range of the computing device;
   responsive to receiving the request, discovering, with the wireless docking service, the one or more peripheral functions without communicating with a wireless docking center;
   consolidating, with the wireless docking service, the one or more peripheral functions into a docking session for the user application; and
   responsive to receiving the request, sending a docking session identifier and one or more respective references corresponding to the one or more peripheral functions from the wireless docking service to the user application.

2. The method of claim 1, further comprising:
receiving, with the wireless docking service, a request to configure at least one of the one or more peripheral functions; and
responsive to receiving the request to configure at least one of the one or more peripheral functions and by the wireless docking service, configuring the at least one of the one or more peripheral functions.

3. The method of claim 1, further comprising:
receiving, with the wireless docking service and from the user application, a request to use at least one of the one or more peripheral functions; and
responsive to receiving the request to use at least one of the one or more peripheral functions, establishing respective corresponding wireless connections with the at least one of the one or more peripheral functions with the wireless docking service.

4. The method of claim 1, wherein the wireless docking communications stack comprises one or more of the following layers that have direct communication interfaces with the wireless docking service: an application service platform layer, a Wi-Fi direct layer, a Miracast layer, a Wi-Fi Serial Bus layer, a Bluetooth layer, a Print service layer, and a Display service layer.

5. The method of claim 1, further comprising:
receiving, with the wireless docking service and from the user application, a request to create a wireless docking environment comprising at least one of the one or more peripheral functions;
responsive to receiving the request to create the wireless docking environment, creating, with a wireless docking service and without communicating with a wireless docking center, the wireless docking environment that includes the at least one of the one or more peripheral functions; and
sending a handle for the wireless docking environment to the user application.

6. The method of claim 5, further comprising:
receiving, with the wireless docking service and from the user application, a request to use the wireless docking environment;
responsive to receiving the request to use the wireless docking environment, establishing respective corresponding wireless connections with at least one peripheral device that offers at least one of the one or more peripheral functions of the wireless docking environment; and
sending the docking session identifier and the one or more respective references corresponding to the one or more peripheral functions to the user application in response to the request to use the wireless docking environment.

7. The method of claim 1, further comprising:
receiving, with the wireless docking service and from the user application, a request to discover any wireless docking environments within a wireless communication range;
responsive to receiving the request, discovering, with the wireless docking service and without communicating with a wireless docking center, one or more wireless docking environments that each includes one or more peripheral functions; and
sending a reference to a wireless docking environment of the wireless docking environments to the user application.

8. The method of claim 7, further comprising:
receiving, with the wireless docking service and from the user application, a request to use the wireless docking environment;
responsive to receiving the request to use the wireless docking environment, establishing respective corresponding wireless connections with at least one peripheral device that offers at least one of the one or more peripheral functions of the wireless docking environment; and
sending the docking session identifier and the one or more respective references corresponding to the one or more peripheral functions to the user application in response to the request to use the wireless docking environment.

9. The method of claim 1, further comprising:
receiving, with the wireless docking service and from the user application, a request to use at least one of the one or more peripheral functions;
responsive to receiving the request to use at least one of the one or more peripheral functions, establishing, for a first one of the one or more peripheral functions and a second one of the one or more peripheral functions, a common application service platform (ASP) session; and
establishing respective corresponding payload connections for the first one of the one or more peripheral functions and the second one of the one or more peripheral functions, wherein each of the corresponding payload connections use the ASP session.

10. The method of claim 9, further comprising:
sending, from the wireless docking service and to an application service platform layer of the wireless docking communications stack, a configuration credential for configuring the first one of the one or more peripheral functions and a second one of the one or more peripheral functions.

11. A device for wireless docking, the device comprising one or more processors configured to:
receive, from a user application and with a wireless docking service of a wireless docking communications stack executing on the device, a request to discover one or more peripheral functions within wireless communication range of the device;
responsive to receiving the request, discover, with the wireless docking service, the one or more peripheral functions without communicating with a wireless docking center;
consolidate, with the wireless docking service, the one or more peripheral functions into a docking session for the user application; and
responsive to receiving the request, send a docking session identifier and one or more respective references corresponding to the one or more peripheral functions from the wireless docking service to the user application.

12. The device of claim 11, wherein the one or more processors are further configured to:
receive, with the wireless docking service, a request to configure at least one of the one or more peripheral functions; and
responsive to receiving the request to configure at least one of the one or more peripheral functions and by the wireless docking service, configure the at least one of the one or more peripheral functions.

13. The device of claim 11, wherein the one or more processors are further configured to:
receive, with the wireless docking service and from the user application, a request to use at least one of the one or more peripheral functions; and responsive to receiving the request to use at least one of the one or more peripheral functions, establish respective corresponding wireless connections with at least one peripheral device that offers at least one of the one or more peripheral functions with the wireless docking service.

14. The device of claim 11, wherein the wireless docking communications stack comprises one or more of the following layers that have direct communication interfaces with the wireless docking service: an application service platform layer, a Wi-Fi direct layer, a Miracast layer, a Wi-Fi Serial Bus layer, a Bluetooth layer, a Print service layer, and a Display service layer.

15. The device of claim 11, wherein the one or more processors are further configured to:
receive, with the wireless docking service and from the user application, a request to create a wireless docking environment comprising at least one of the one or more peripheral functions;
responsive to receiving the request to create the wireless docking environment, create, with a wireless docking service and without communicating with a wireless docking center, the wireless docking environment that includes the at least one of the one or more peripheral functions; and
send a handle for the wireless docking environment to the user application.

16. The device of claim 15, wherein the one or more processors are further configured to:
receive, with the wireless docking service and from the user application, a request to use the wireless docking environment;
responsive to receiving the request to use the wireless docking environment, establish respective corresponding wireless connections with at least one peripheral device that offers at least one of the one or more peripheral functions of the wireless docking environment; and
send the docking session identifier and the one or more respective references corresponding to the one or more peripheral functions to the user application in response to the request to use the wireless docking environment.

17. The device of claim 11, wherein the one or more processors are further configured to:
receive, with the wireless docking service and from the user application, a request to discover any wireless docking environments within a wireless communication range;
responsive to receiving the request, discover, with the wireless docking service and without communicating with a wireless docking center, one or more wireless docking environments that each includes one or more peripheral functions; and
send a reference to a wireless docking environment of the wireless docking environments to the user application.

18. The device of claim 17, wherein the one or more processors are further configured to:
receive, with the wireless docking service and from the user application, a request to use the wireless docking environment;
responsive to receiving the request to use the wireless docking environment, establish respective corresponding wireless connections with at least one peripheral device that offers at least one of the one or more peripheral functions of the wireless docking environment; and
send the docking session identifier and the one or more respective references corresponding to the one or more peripheral functions to the user application in response to the request to use the wireless docking environment.

19. The device of claim 11, wherein the one or more processors are further configured to:
receive, with the wireless docking service and from the user application, a request to use at least one of the one or more peripheral functions;
responsive to receiving the request to use at least one of the one or more peripheral functions, establish, for a first one of the one or more peripheral functions and a second one of the one or more peripheral functions, a common application service platform (ASP) session; and
establish respective corresponding payload connections for the first one of the one or more peripheral functions and the second one of one or more the peripheral functions, wherein each of the corresponding payload connections use the ASP session.

20. The device of claim 19, wherein the one or more processors are further configured to:
send, from the wireless docking service and to an application service platform layer of the wireless docking communications stack, a configuration credential for configuring the first one of the one or more peripheral functions and a second one of the one or more peripheral functions.

21. An apparatus for wireless docking comprising:
means for receiving, from a user application and with a wireless docking service of a wireless docking communications stack executing on the apparatus, a request to discover one or more peripheral functions within wireless communication range of the apparatus;
means for, responsive to receiving the request, discovering, with the wireless docking service, the one or more peripheral functions without communicating with a wireless docking center;
means for consolidating, with the wireless docking service, the one or more peripheral functions into a docking session for the user application; and
means for, responsive to receiving the request, sending a docking session identifier and one or more respective references corresponding to the one or more peripheral functions from the wireless docking service to the user application.

22. The apparatus of claim 21, further comprising:
means for receiving, with the wireless docking service, a request to configure at least one of the one or more peripheral functions; and
means for, responsive to receiving the request to configure at least one of the one or more peripheral functions and by the wireless docking service, configuring the at least one of the one or more peripheral functions.

23. The apparatus of claim 21, further comprising:
means for receiving, with the wireless docking service and from the user application, a request to use at least one of the one or more peripheral functions; and
means for, responsive to receiving the request to use at least one of the one or more peripheral functions, establishing respective corresponding wireless connections with at least one peripheral device that offers at least one of the one or more peripheral functions with the wireless docking service.

24. The apparatus of claim 21, wherein the wireless docking communications stack comprises one or more of the following layers that have direct communication interfaces with the wireless docking service: an application service platform layer, a Wi-Fi direct layer, a Miracast layer, a Wi-Fi Serial Bus layer, a Bluetooth layer, a Print service layer, and a Display service layer.

25. The apparatus of claim 21, further comprising:
means for receiving, with the wireless docking service and from the user application, a request to create a wireless docking environment comprising at least one of the one or more peripheral functions;
means for, responsive to receiving the request to create the wireless docking environment, creating, with a wireless docking service and without communicating with a wireless docking center, the wireless docking environment that includes the at least one of the one or more peripheral functions; and
means for sending a handle for the wireless docking environment to the user application.

26. The apparatus of claim 25, further comprising:
means for receiving, with the wireless docking service and from the user application, a request to use the wireless docking environment;
means for, responsive to receiving the request to use the wireless docking environment, establishing respective corresponding wireless connections with at least one peripheral device that offers at least one of the one or more peripheral functions of the wireless docking environment; and
means for sending the docking session identifier and the one or more respective references corresponding to the one or more peripheral functions to the user application in response to the request to use the wireless docking environment.

27. The apparatus of claim 21, further comprising:
means for receiving, with the wireless docking service and from the user application, a request to discover any wireless docking environments within a wireless communication range;
means for, responsive to receiving the request, discovering, with the wireless docking service and without communicating with a wireless docking center, one or more wireless docking environments that each includes one or more peripheral functions; and
means for sending a reference to a wireless docking environment of the wireless docking environments to the user application.

28. The apparatus of claim 27, further comprising:
means for receiving, with the wireless docking service and from the user application, a request to use the wireless docking environment;
means for, responsive to receiving the request to use the wireless docking environment, establishing respective corresponding wireless connections with at least one peripheral device that offers at least one of the one or more peripheral functions of the wireless docking environment; and
means for sending the docking session identifier and the one or more respective references corresponding to the one or more peripheral functions to the user application in response to the request to use the wireless docking environment.

29. The apparatus of claim 21, further comprising:
means for receiving, with the wireless docking service and from the user application, a request to use at least one of the one or more peripheral functions;
means for, responsive to receiving the request to use at least one of the one or more peripheral functions, establishing, for a first one of the one or more peripheral functions and a second one of the one or more peripheral functions, a common application service platform (ASP) session; and
means for establishing respective corresponding payload connections for the first one of the one or more peripheral functions and the second one of the one or more peripheral functions, wherein each of the corresponding payload connections use the ASP session.

30. The apparatus of claim 29, further comprising:
means for sending, from the wireless docking service and to an application service platform layer of the wireless docking communications stack, a configuration credential for configuring the first one of the one or more peripheral functions and a second one of the one or more peripheral functions.

31. A non-transitory computer-readable storage medium comprising instructions for wireless docking stored thereon that, when executed, configure one or more processors to:
receive, from a user application and with a wireless docking service of a wireless docking communications stack executing on a computing device, a request to discover one or more peripheral functions within wireless communication range of the computing device;
responsive to receiving the request, discover, with the wireless docking service, the one or more peripheral functions without communicating with a wireless docking center;
consolidate, with the wireless docking service, the one or more peripheral functions into a docking session for the user application; and
responsive to receiving the request, send a docking session identifier and one or more respective references corresponding to the one or more peripheral functions from the wireless docking service to the user application.

32. The computer-readable storage medium of claim 31, wherein the instructions further configure the one or more processors to:
receive, with the wireless docking service, a request to configure at least one of the one or more peripheral functions; and
responsive to receiving the request to configure at least one of the one or more peripheral functions and by the wireless docking service, configure the at least one of the one or more peripheral functions.

33. The computer-readable storage medium of claim 31, wherein the instructions further configure the one or more processors to:
receive, with the wireless docking service and from the user application, a request to use at least one of the one or more peripheral functions; and
responsive to receiving the request to use at least one of the one or more peripheral functions, establish respective corresponding wireless connections with at least one peripheral device that offers at least one of the one or more peripheral functions with the wireless docking service.

34. The computer-readable storage medium of claim 31, wherein the wireless docking communications stack comprises one or more of the following layers that have direct communication interfaces with the wireless docking service: an application service platform layer, a Wi-Fi direct layer, a Miracast layer, a Wi-Fi Serial Bus layer, a Bluetooth layer, a Print service layer, and a Display service layer.

35. The computer-readable storage medium of claim 31, wherein the instructions further configure the one or more processors to:

receive, with the wireless docking service and from the user application, a request to create a wireless docking environment comprising at least one of the one or more peripheral functions;

responsive to receiving the request to create the wireless docking environment, create, with a wireless docking service and without communicating with a wireless docking center, the wireless docking environment that includes the at least one of the one or more peripheral functions; and send a handle for the wireless docking environment to the user application.

36. The computer-readable storage medium of claim 35, wherein the instructions further configure the one or more processors to:

receive, with the wireless docking service and from the user application, a request to use the wireless docking environment;

responsive to receiving the request to use the wireless docking environment, establish respective corresponding wireless connections with at least one peripheral device that offers at least one of the one or more peripheral functions of the wireless docking environment; and send the docking session identifier and the one or more respective references corresponding to the one or more peripheral functions to the user application in response to the request to use the wireless docking environment.

37. The computer-readable storage medium of claim 31, wherein the instructions further configure the one or more processors to:

receive, with the wireless docking service and from the user application, a request to discover any wireless docking environments within a wireless communication range;

responsive to receiving the request, discover, with the wireless docking service and without communicating with a wireless docking center, one or more wireless docking environments that each includes one or more peripheral functions; and send a reference to a wireless docking environment of the wireless docking environments to the user application.

38. The computer-readable storage medium of claim 37, wherein the instructions further configure the one or more processors to:

receive, with the wireless docking service and from the user application, a request to use the wireless docking environment;

responsive to receiving the request to use the wireless docking environment, establish respective corresponding wireless connections with at least one peripheral device that offers at least one of the one or more peripheral functions of the wireless docking environment; and send the docking session identifier and the one or more respective references corresponding to the one or more peripheral functions to the user application in response to the request to use the wireless docking environment.

39. The computer-readable storage medium of claim 31, wherein the instructions further configure the one or more processors to:

receive, with the wireless docking service and from the user application, a request to use at least one of the one or more peripheral functions;

responsive to receiving the request to use at least one of the one or more peripheral functions, establish, for a first one of the one or more peripheral functions and a second one of the one or more peripheral functions, a common application service platform (ASP) session; and establish respective corresponding payload connections for the first one of the one or more peripheral functions and the second one of the one or more peripheral functions, wherein each of the corresponding payload connections use the ASP session.

40. The computer-readable storage medium of claim 39, wherein the instructions further configure the one or more processors to:

send, from the wireless docking service and to an application service platform layer of the wireless docking communications stack, a configuration credential for configuring the first one of the one or more peripheral functions and a second one of the one or more peripheral functions.

\* \* \* \* \*